US012706364B2

(12) United States Patent
Ikemoto et al.

(10) Patent No.: US 12,706,364 B2
(45) Date of Patent: Aug. 11, 2026

(54) TRANSMISSION LINE INCLUDING A MULTILAYER BODY HAVING A SIGNAL CONDUCTOR LAYER, GROUND CONDUCTOR LAYERS AND A HOLLOW PORTION OF VARYING WIDTH

(71) Applicant: Murata Manufacturing Co., Ltd., Nagaokakyo (JP)

(72) Inventors: Nobuo Ikemoto, Nagaokakyo (JP); Noriaki Okuda, Nagaokakyo (JP); Kosuke Nishio, Nagaokakyo (JP); Masanori Okamoto, Nagaokakyo (JP); Kentarou Kawabe, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 457 days.

(21) Appl. No.: 18/198,473

(22) Filed: May 17, 2023

(65) Prior Publication Data

US 2023/0291086 A1 Sep. 14, 2023

Related U.S. Application Data

(63) Continuation of application No. PCT/JP2021/043306, filed on Nov. 26, 2021.

(30) Foreign Application Priority Data

Nov. 30, 2020 (JP) ................................ 2020-198385

(51) Int. Cl.
*H01P 3/08* (2006.01)

(52) U.S. Cl.
CPC ............. *H01P 3/088* (2013.01); *H01P 3/082* (2013.01)

(58) Field of Classification Search
CPC ................................ H01P 3/082; H01P 3/088
(Continued)

(56) References Cited

U.S. PATENT DOCUMENTS 3,518,688 A * 6/1970 Stayboldt et al. ...... H01P 3/087 343/873
5,712,607 A 1/1998 Dittmer et al.
(Continued)

FOREIGN PATENT DOCUMENTS

JP 62269401 A 11/1987
JP 09246813 A 9/1997
(Continued)

OTHER PUBLICATIONS

International Search Report in PCT/JP2021/043306, mailed Feb. 1, 2022, 3 pages.
(Continued)

*Primary Examiner* — Benny T Lee
(74) *Attorney, Agent, or Firm* — Keating & Bennett, LLP

(57) ABSTRACT

In a transmission line, a hollow portion overlaps a first ground conductor layer in an up-down direction. In a first orthogonal direction, the hollow portion includes a first portion extending in a second orthogonal direction of a signal conductor layer. In the first portion, a portion at which a width of the first portion in the second orthogonal direction has a first portion maximum width value is a first portion maximum width portion. A portion at which the width of the first portion in the second orthogonal direction has a first portion minimum width value is a first portion minimum width portion. A portion at which the width of the first portion in the second orthogonal direction has a first portion intermediate width value is a first portion intermediate width
(Continued)

portion located between the first portion maximum width portion and the first portion minimum width portion in the front-back direction.

18 Claims, 25 Drawing Sheets

(58) Field of Classification Search
USPC .......................................................... 333/238
See application file for complete search history.

(56) References Cited

U.S. PATENT DOCUMENTS 5,724,012 A * 3/1998 Teunisse ................. H01P 3/085
333/238
5,844,450 A 12/1998 Buer et al.
2002/0084876 A1 7/2002 Wright et al.
2018/0309182 A1 10/2018 Iida et al.

FOREIGN PATENT DOCUMENTS

JP 1041710 A 2/1998
JP 2007123740 A 5/2007
JP 2020141406 A 9/2020
WO 2017130731 A1 8/2017

OTHER PUBLICATIONS

Written Opinion in PCT/JP2021/043306, mailed Feb. 1, 2022, 5 pages.

* cited by examiner

10h

TRANSMISSION LINE INCLUDING A MULTILAYER BODY HAVING A SIGNAL CONDUCTOR LAYER, GROUND CONDUCTOR LAYERS AND A HOLLOW PORTION OF VARYING WIDTH

CROSS REFERENCE TO RELATED APPLICATIONS

This application claims the benefit of priority to Japanese Patent Application No. 2020-198385 filed on Nov. 30, 2020 and is a Continuation Application of PCT Application No. PCT/JP2021/043306 filed on Nov. 26, 2021 and corresponding to WO 2022/114092 published on Jun. 2, 2022. The entire contents of each application are hereby incorporated herein by reference.

BACKGROUND OF THE INVENTION

1. Field of the Invention

The present invention relates to a transmission line through which a radio frequency signal is transmitted, and an electronic device.

2. Description of the Related Art

As an invention related to a transmission line in the past, an electronic device described in Japanese Unexamined Patent Application Publication No. 2020-141406 (published 3 Sep. 2020) (particularly, FIG. 16) has been known, for example. The electronic device includes a signal transmission line. The signal transmission line includes a multilayer body and a signal conductor. The multilayer body has a structure in which multiple resin layers are laminated. The signal conductor is provided in the multilayer body. Multiple hollow portions are provided in the multilayer body. The multiple hollow portions are arranged in a direction in which the signal conductor extends.

With the use of the transmission line described in Japanese Unexamined Patent Application Publication No. 2020-141406, transmission loss of a transmission line is reduced. More specifically, the hollow portion is provided in the vicinity of the signal conductor. Air having a low dielectric constant is present in the hollow portion. Therefore, a dielectric constant around the signal conductor is lowered. As a result, in the transmission line, occurrence of dielectric loss in a radio frequency signal transmitted through the signal conductor is prevented or reduced, and thus the transmission loss of the transmission line is reduced.

SUMMARY OF THE INVENTION

Incidentally, in the electronic device described in Japanese Unexamined Patent Application Publication No. 2020-141406, characteristic impedance generated in the signal conductor is likely to rapidly change. A section in which the signal conductor and the hollow portion overlap when viewed in a lamination direction is referred to as an "overlapping section". A section in which the signal conductor and the hollow portion do not overlap when viewed in the lamination direction is referred to as a "non-overlapping section". A dielectric constant around the signal conductor in the overlapping section is smaller than a dielectric constant around the signal conductor in the non-overlapping section. Therefore, a capacitance value generated in the signal conductor in the overlapping section is smaller than a capacitance value generated in the signal conductor in the non-overlapping section. As a result, characteristic impedance generated in the signal conductor in the overlapping section becomes larger than characteristic impedance generated in the signal conductor in the non-overlapping section. Here, the hollow portion has a rectangular shape when n viewed in the lamination direction. Therefore, at a boundary between the overlapping section and the non-overlapping section, the dielectric constant around the signal conductor changes rapidly. As a result, at the boundary between the overlapping section and the non-overlapping section, the characteristic impedance generated in the signal conductor changes rapidly.

Preferred embodiments of the present invention provide transmission lines and electronic devices each capable of preventing or reducing a rapid change in characteristic impedance generated in a signal conductor layer.

A transmission line according to an aspect of a preferred embodiment of the present invention includes a multilayer body including insulation layers laminated in an up-down direction, a signal conductor layer provided in the multilayer body and extending in a front-back direction orthogonal to the up-down direction, and a first ground conductor layer provided in the multilayer body and provided above the signal conductor layer to overlap the signal conductor layer when viewed in the up-down direction, in which a hollow portion is provided in the multilayer body, the hollow portion overlaps the first ground conductor layer when viewed in the up-down direction, a first orthogonal direction orthogonal to the front-back direction, and a direction orthogonal to the front-back direction and the first orthogonal direction, are defined as a second orthogonal direction, when viewed in the first orthogonal direction, the hollow portion includes a first portion positioned in the second orthogonal direction of the signal conductor layer, a width of the first portion in the second orthogonal direction has a first portion maximum width value, a first portion minimum width value, and a first portion intermediate width value less than the first portion maximum width value and greater than the first portion minimum width value, in the first portion, a portion at which the width of the first portion in the second orthogonal direction has the first portion maximum width value is a first portion maximum width portion, in the first portion, a portion at which the width of the first portion in the second orthogonal direction has the first portion minimum width value is a first portion minimum width portion, in the first portion, a portion at which the width of the first portion in the second orthogonal direction has the first portion intermediate width value is a first portion intermediate width portion, and the first portion intermediate width portion is positioned between the first portion maximum width portion and the first portion minimum width portion in the front-back direction.

According to the transmission lines and the electronic devices of preferred embodiments of the present invention, a rapid change in characteristic impedance generated in a signal conductor layer may be prevented or reduced.

The above and other elements, features, steps, characteristics and advantages of the present invention will become more apparent from the following detailed description of the preferred embodiments with reference to the attached drawings, where like features are denoted by like reference labels throughout the detailed description of the drawings.

DETAILED DESCRIPTION OF THE PREFERRED EMBODIMENTS

Preferred Embodiments

Structure of Transmission Line

Figure 1:
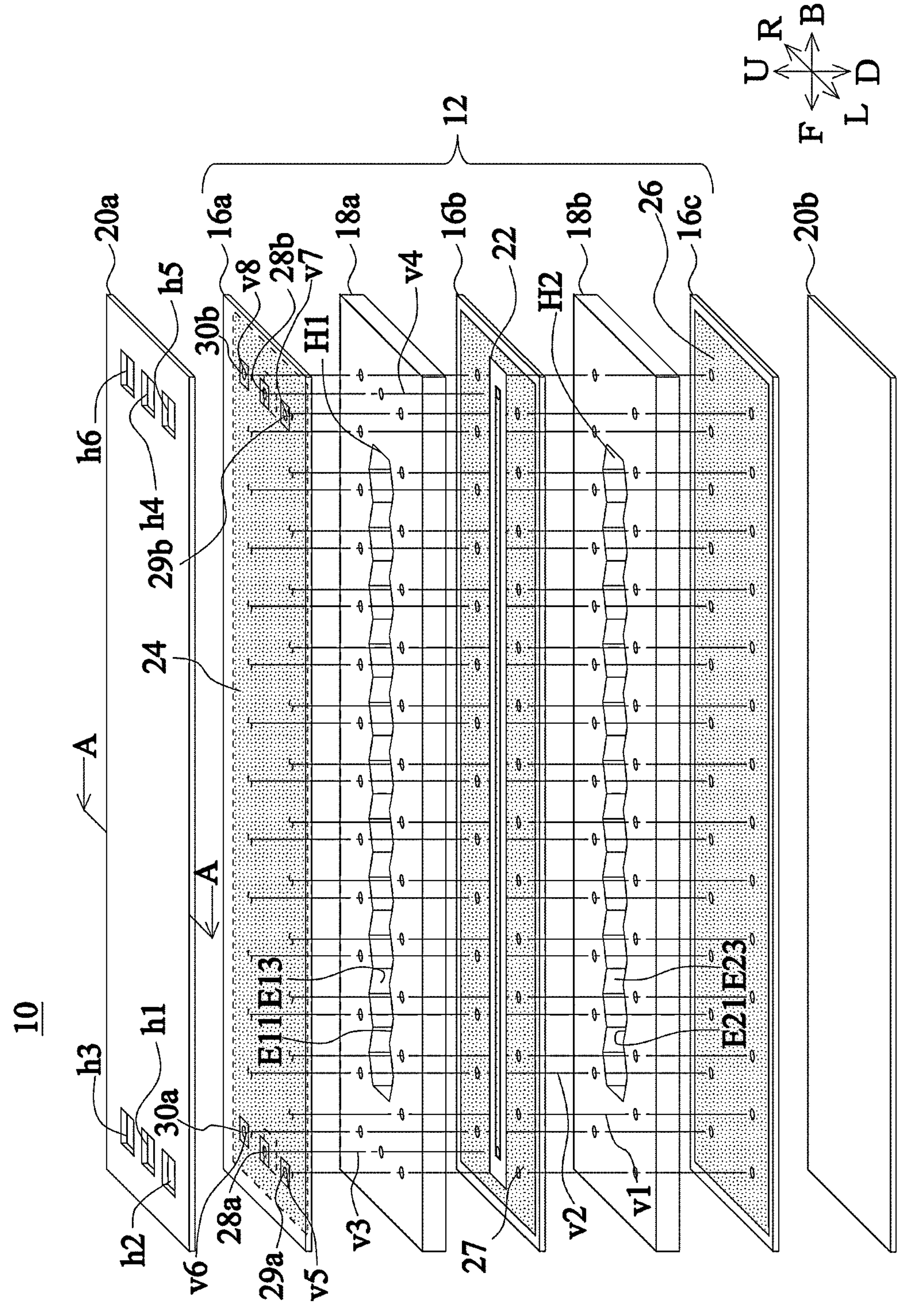
FIG. 1 is an exploded perspective view of a transmission line.
Figure 2:
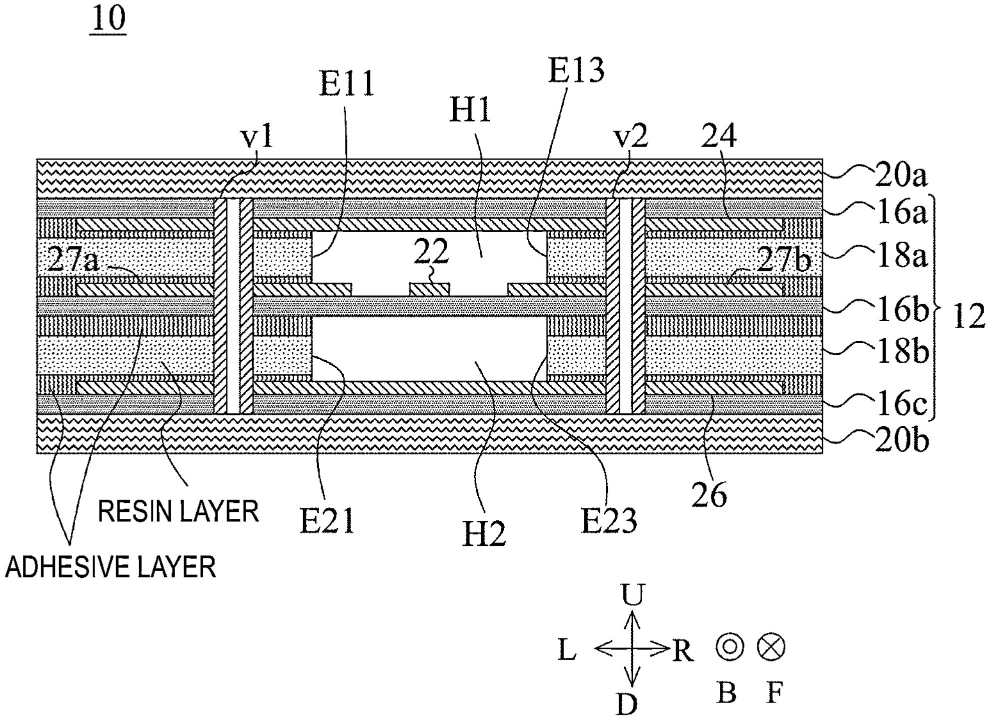
FIG. 2 is a sectional view of the transmission line taken along a line A-A in FIG. 1.
Figure 3:
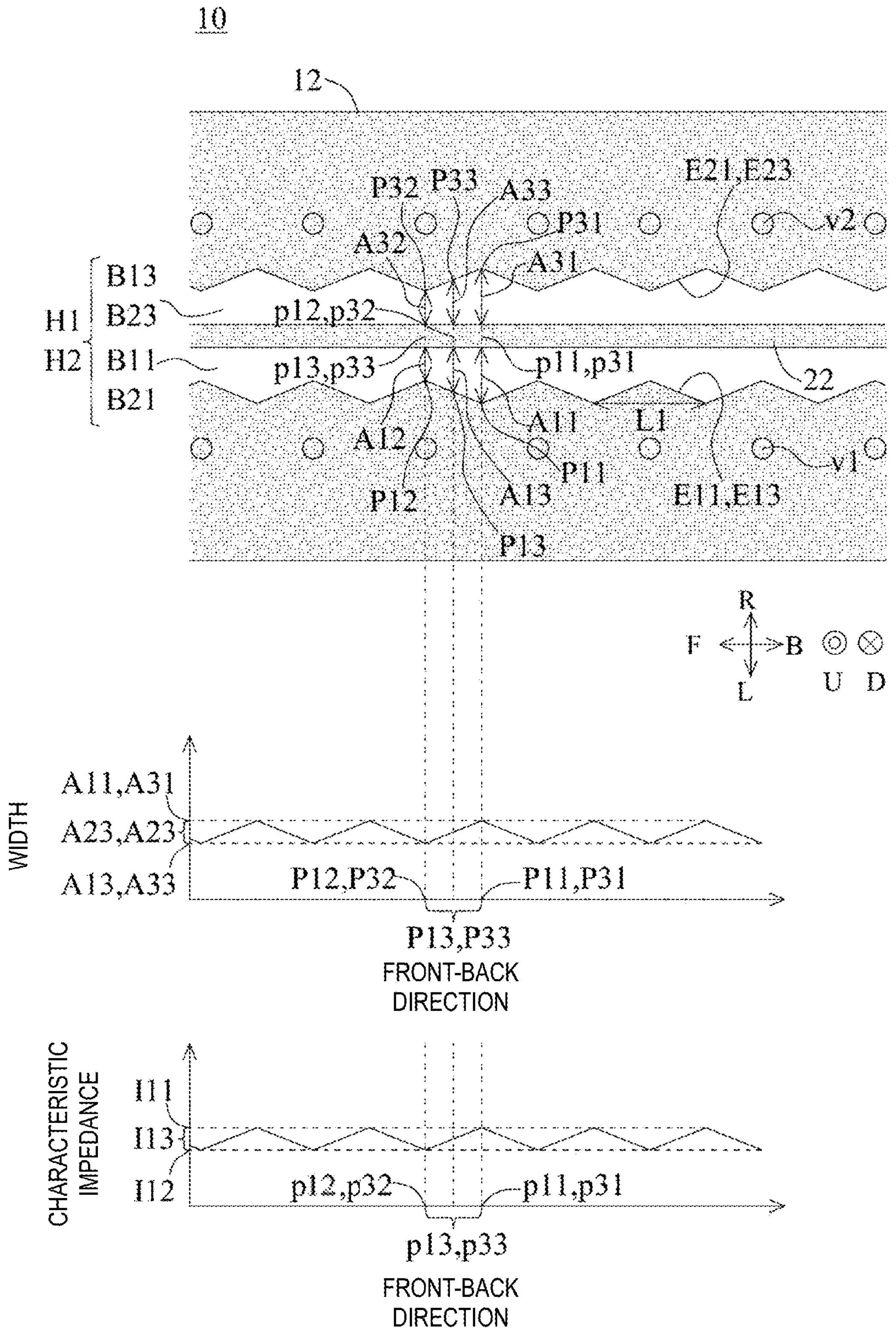
FIG. 3 is a perspective view of the transmission line in an up-down direction.

Hereinafter, a structure of a transmission line 10 according to a preferred embodiment of the present invention will be described with reference to the drawings. FIG. 1 is an exploded perspective view of the transmission line 10. Note that, in FIG. 1, only representative interlayer connection conductors v1 and v2 among the multiple interlayer connection conductors v1 and v2 are denoted by reference signs. FIG. 2 is a sectional view of the transmission line 10 taken along a line A-A in FIG. 1. FIG. 3 is a perspective view of the transmission line 10 in an up-down direction.

In the present description, directions are defined as follows. A lamination direction of a multilayer body 12 of the transmission line 10 is defined as the up-down (hereinafter designated by U-D) direction. A direction in which a signal conductor layer 22 of the transmission line 10 extends is defined as a front-back (hereinafter designated by F-B) direction. A line width direction of the signal conductor layer 22 is defined as a left-right (hereinafter designated by L-R) direction. The up-down direction, the front-back direction, and the left-right direction are orthogonal to each other.

Hereinafter, X generically refers to a "component" or a "member" of the transmission line 10 of the present preferred embodiment that is described herein. In the present description, unless otherwise specified, each portion of X is defined as follows. A front portion of X means a front half of X. A back portion of X means a back half of X. A left portion of X means a left half of X.

A right portion of X means a right half of X. An upper portion of X means an upper half of X. A lower portion of X means a lower half of X. A front end of X means an end in a front direction of X. A back end of X means an end in a back direction of X. A left end of X means an end in a left direction of X. A right end of X means an end in a right direction of X. An upper end of X means an end in an upward direction of X. A lower end of X means an end in a downward direction of X. A front end portion of X means a front end of X and the vicinity thereof. A back end portion of X means a back end of X and the vicinity thereof. A left end portion of X means a left end of X and the vicinity thereof. A right end portion of X means a right end of X and the vicinity thereof. An upper end portion of X means an upper end of X and the vicinity thereof. A lower end portion of X means a lower end of X and the vicinity thereof.

First, a structure of the transmission line 10 will be described with reference to FIG. 1. The transmission line 10 transmits a radio frequency signal. The transmission line 10 is used to electrically connect two circuits in an electronic device such as a smartphone. As illustrated in FIG. 1, the transmission line 10 includes the multilayer body 12, protection layers 20*a* and 20*b*, the signal conductor layer 22, a first ground conductor layer 24, a second ground conductor layer 26, a third ground conductor layer 27, signal terminals 28*a* and 28*b*, ground terminals 29*a*, 29*b*, 30*a*, and 30*b*, the multiple interlayer connection conductors v1 and v2, and interlayer connection conductors v3, v4, v5, v6, v7, and v8.

The multilayer body 12 has a plate shape. Accordingly, the multilayer body 12 includes an upper main surface and a lower main surface. The upper main surface and the lower main surface of the multilayer body 12 each have a rectangular or substantially rectangular shape having long sides extending in the front-back direction. Accordingly, a length of the multilayer body 12 in the front-back direction is longer than a length of the multilayer body 12 in the left-right direction.

The multilayer body 12 includes insulation layers 16*a* to 16*c*, 18*a*, and 18*b* as illustrated in FIG. 1. The multilayer body 12 has a structure in which the insulation layers 16*a*, 18*a*, 16*b*, 18*b*, and 16*c* are laminated in this order from an upper side to a lower side in the up-down direction (FIG. 2). The insulation layers 16*a* to 16*c*, 18*a*, and 18*b* each have the same rectangular or substantially rectangular shape as the multilayer body 12 when viewed in the up-down direction. The insulation layers 16*a* to 16*c* each are a dielectric sheet having flexibility. A material of each of the insulation layers 16*a* to 16*c* is thermoplastic resin (FIG. 2), for example. The thermoplastic resin is liquid crystal polymer or polytetrafluoroethylene (PTFE), for example. The material of each of the insulation layers 16*a* to 16*c* may be polyimide. The insulation layer 18*a* has a structure in which an adhesive layer (FIG. 2) is provided on an upper main surface of a resin layer and a lower main surface of the resin layer. A material of the resin layer of each of the insulation layers 18*a* and 18*b* is epoxy resin, fluororesin, or acrylic resin, for example. As described above, the material of the resin layer of each of the insulation layers 18*a* and 18*b* is different from the material of the resin layer of each of the insulation layers 16*a* to 16*c*. The adhesive layer is applied to the upper main surface and the lower main surface of the resin layer. Note that, the insulation layer 18*a* does not need to have the adhesive layer. The insulation layer 18*a* may function as an adhesive layer to bond the insulation layer 16*a* present on the insulation layer 18*a* and the insulation layer 16*b* present under the insulation layer 18*a*. The insulation layer 18*b* may function as an adhesive layer to bond the insulation layer 16*b* present on the insulation layer 18*b* and the insulation layer 16*c* present under the insulation layer 18*b*. In the case above, the insulation layers 18*a* and 18*b* each are sheets having adhesiveness.

The signal conductor layer 22 is provided in the multilayer body 12 as illustrated in FIG. 1. In the present preferred embodiment, the signal conductor layer 22 is provided on the upper main surface of the insulation layer 16*b*. Thus, the signal conductor layer 22 is provided in the multilayer body 12. The signal conductor layer 22 has a linear shape. The signal conductor layer 22 extends in the front-back direction. The signal conductor layer 22 is positioned at a center in the left-right direction of the upper main surface of the insulation layer 16*b*.

The first ground conductor layer 24 is provided in the multilayer body 12 as illustrated in FIG. 1. The first ground conductor layer 24 is provided above the signal conductor layer 22 to overlap the signal conductor layer 22 when viewed in the up-down direction. In the present description, "the first ground conductor layer 24 is provided above the signal conductor layer 22" refers to the following state. At least a portion of the first ground conductor layer 24 is disposed in a region through which the signal conductor layer 22 passes when moving in parallel with the upward direction. Therefore, the first ground conductor layer 24 may be placed within the region through which the signal conductor layer 22 passes when moving in parallel with the upward direction, or may protrude from the region through which the signal conductor layer 22 passes when moving in parallel with the upward direction. Here, in the present preferred embodiment, the first ground conductor layer 24 is provided on a lower main surface of the insulation layer 16*a*. The first ground conductor layer 24 covers substantially the entire lower main surface of the insulation layer 16*a*. Therefore, the first ground conductor layer 24 protrudes from the region through which the signal conductor layer 22 passes when moving in parallel with the upward direction.

The second ground conductor layer 26 is provided in the multilayer body 12 as illustrated in FIG. 1. The second ground conductor layer 26 is provided below the signal conductor layer 22 to overlap the signal conductor layer 22 when viewed in the up-down direction. In the present preferred embodiment, the second ground conductor layer 26 is provided on an upper main surface of the insulation layer 16*c*. The second ground conductor layer 26 covers substantially the entire upper main surface of the insulation layer 16*c*. The signal conductor layer 22, the first ground conductor layer 24, and the second ground conductor layer 26 described above have a strip line structure.

The third ground conductor layer 27 is provided on the upper main surface of the insulation layer 16*b* and includes third ground conductor layers 27*a* and 27*b* (FIGS. 1 and 2). The third ground conductor layer 27 surrounds the signal conductor layer 22 when viewed in the up-down direction. The third ground conductor layer 27 is provided on the left and right of the signal conductor layer 22.

The multiple interlayer connection conductors v1 and v2 each electrically connect the first ground conductor layer 24, the second ground conductor layer 26, and the third ground conductor layer 27. More specifically, the multiple interlayer connection conductors v1 and v2 each penetrate through the insulation layers 16*a* to 16*c*, 18*a*, and 18*b* in the up-down direction. Upper end portions of the multiple interlayer connection conductors v1 and v2 each are connected to the first ground conductor layer 24. Lower end portions of the multiple interlayer connection conductors v1 and v2 each are connected to the second ground conductor layer 26. Intermediate portions of the multiple interlayer connection conductors v1 and v2 each are connected to the third ground conductor layer 27. The multiple interlayer connection conductors v1 are provided on the left of the signal conductor layer 22. The multiple interlayer connection conductors v1 are arranged in a row at equal or substantially equal intervals in the front-back direction. The multiple interlayer connection conductors v2 are provided on the right of the signal conductor layer 22. The multiple interlayer connection conductors v2 are arranged in a row at equal or substantially equal intervals in the front-back direction.

The signal terminal 28*a* is provided on an upper main surface of the multilayer body 12. More specifically, the signal terminal 28*a* is provided at a front end portion of an upper main surface of the insulation layer 16*a*. The signal terminal 28*a* overlaps a front end portion of the signal conductor layer 22 when viewed in the up-down direction. The signal terminal 28*a* has a rectangular or substantially rectangular shape when viewed in the up-down direction.

The interlayer connection conductor v3 electrically connects the signal terminal 28*a* and the signal conductor layer 22. Specifically, the interlayer connection conductor v3 penetrates through the insulation layers 16*a* and 18*a* in the up-down direction. An upper end of the interlayer connection conductor v3 is connected to the signal terminal 28*a*. A lower end of the interlayer connection conductor v3 is connected to the front end portion of the signal conductor layer 22. Thus, the signal terminal 28*a* is electrically connected to the signal conductor layer 22. Further, the first ground conductor layer 24 is not provided around the interlayer connection conductor v3 so that the interlayer connection conductor v3 is insulated from the first ground conductor layer 24. A radio frequency signal is inputted to and outputted from the signal conductor layer 22 via the signal terminal 28*a*.

Note that the signal terminal 28*b* and the interlayer connection conductor v4 have a structure symmetrical to the signal terminal 28*a* and the interlayer connection conductor v3 in the front-back direction. Accordingly, a description of the signal terminal 28*b* and the interlayer connection conductor v4 will be omitted.

The ground terminal 29*a* is provided on the upper main surface of the multilayer body 12. More specifically, the ground terminal 29*a* is provided at the left end portion of the upper main surface of the insulation layer 16*a*. The ground terminal 29*a* is provided on the left of the signal terminal 28*a*. The ground terminal 29*a* overlaps the first ground conductor layer 24 when viewed in the up-down direction. The ground terminal 29*a* has a rectangular or substantially rectangular shape when viewed in the up-down direction.

The interlayer connection conductor v5 electrically connects the ground terminal 29*a* and the first ground conductor layer 24. Specifically, the interlayer connection conductor v5 penetrates through the insulation layer 16*a* in the up-down direction. An upper end of the interlayer connection conductor v5 is connected to the ground terminal 29*a*. A lower end of the interlayer connection conductor v5 is connected to the first ground conductor layer 24. Thus, the ground terminal 29*a* is electrically connected to the first ground conductor layer 24. The first ground conductor layer 24 is connected to ground electric potential via the ground terminal 29*a*. Note that the ground terminal 30*a* and the interlayer connection conductor v6 have a structure symmetrical to a structure of the ground terminal 29*a* and the interlayer connection conductor v5 in the left-right direction. Accordingly, a description of the ground terminal 30*a* and the interlayer connection conductor v6 is omitted.

Further, the ground terminals 29*b* and 30*b* and the interlayer connection conductors v7 and v8 have a structure symmetrical to the structure of the ground terminal 29*a* and 30*a* and the interlayer connection conductors v5 and v6 in the front-back direction. Accordingly, a description of the ground terminals 29*b* and 30*b* and the interlayer connection conductors v7 and v8 is omitted.

The signal conductor layer 22, the first ground conductor layer 24, the second ground conductor layer 26, the third ground conductor layer 27, the signal terminals 28*a* and 28*b*, and the ground terminals 29*a*, 29*b*, 30*a*, and 30*b* described above are formed by etching a metal foil provided on the upper main surface or the lower main surface of each of the insulation layers 16*a* to 16*c*, for example. The metal foil is a copper foil, for example. Further, each of the interlayer connection conductors v1 to v8 is a through-hole conductor, for example. The through-hole conductor is produced by forming a through-hole in each of the insulation layers 16*a* to 16*c*, 18*a*, and 18*b* and plating the through-hole. Note that each of the interlayer connection conductors v1 to v8 may be a via-hole conductor. The via-hole conductor is produced by forming a through-hole in each of the insulation layers 16*a* to 16*c*, 18*a*, and 18*b*, filling the through-hole with a conductive paste, and sintering the conductive paste.

The protection layers 20*a* and 20*b* each are a flexible insulation layer. Note that the protection layers 20*a* and 20*b* each are not part of the multilayer body 12. The protection layers 20*a* and 20*b* each have the same rectangular shape as the multilayer body 12 when viewed in the up-down direction.

The protection layer 20*a* covers substantially the entire upper main surface of the insulation layer 16*a*. Thus, the protection layer 20*a* protects the first ground conductor layer 24. Note that openings h1 to h6 are provided in the protection layer 20*a*. The opening h1 overlaps the signal terminal 28*a* when viewed in the up-down direction. Thus, the signal terminal 28*a* is exposed to the outside from the transmission line 10 through the opening h1. The opening h2 is provided to the left of the opening h1. The opening h2 overlaps the ground terminal 29*a* when viewed in the up-down direction. Thus, the ground terminal 29*a* is exposed to the outside from the transmission line 10 through the opening h2. The opening h3 is provided to the right of the opening h1. The opening h3 overlaps the ground terminal 30*a* when viewed in the up-down direction. Thus, the ground terminal 30*a* is exposed to the outside from the transmission line 10 through the opening h3. Note that structures of the openings h4 to h6 are respectively symmetrical to structures of the openings h1 to h3 in the front-back direction. Accordingly, a description of the openings h4 to h6 will be omitted.

Next, hollow portions H1 and H2 will be described with reference to FIG. 1 to FIG. 3. The hollow portion H1 is provided in the multilayer body 12. More specifically, the hollow portion H1 is provided in an insulation layer positioned above the signal conductor layer 22 and below the first ground conductor layer 24. In the present preferred embodiment, the insulation layer 18*a* is provided with a hollow portion H1 penetrating through the insulation layer 18*a* in the up-down direction as illustrated in FIG. 2. The hollow portion H1 extends in the front-back direction when viewed in the up-down direction as illustrated in FIG. 1. Note that an inner wall E11 on a left side of the hollow portion H1 and an inner wall E13 on a right side of the hollow portion H1 have a zigzag shape when viewed in the up-down direction as illustrated in FIG. 3. The hollow portion H1 is provided at a center of the insulation layer 18*a* in the left-right direction. Thus, at least part of the hollow portion H1 overlaps the signal conductor layer 22 when viewed in the up-down direction. Further, the hollow portion H1 overlaps the first ground conductor layer 24 when viewed in the up-down direction. Accordingly, the signal conductor layer 22 and the first ground conductor layer 24 face each other with the hollow portion H1 interposed therebetween as illustrated in FIG. 2.

Here, a structure of the hollow portion H1 will be described in more detail. The hollow portion H1 includes a first portion B11 and a third portion B13 as illustrated in FIG. 3. As also illustrated in FIG. 3, the hollow portion H2 includes portions B21 and B23 that are similar to the first and third portions 11 and 13. The first portion B11 is a portion of the hollow portion H1 positioned on the left (second orthogonal direction) of the signal conductor layer 22 when viewed in the up-down direction (first orthogonal direction). As described above, the inner wall E11 on the left side of the hollow portion H1 and the inner wall E13 on the right side of the hollow portion H1 each have a zigzag shape as illustrated in FIG. 3. Accordingly, the first portion B11 has a first periodic structure in which a width of the first portion B11 in the left-right direction (second orthogonal direction) periodically changes with a predetermined distance in the front-back direction. Hereinafter, the width of the first portion B11 in the left-right direction (second orthogonal direction) will be described in detail.

The inner wall E11 has a zigzag shape in which multiple straight lines are combined. Therefore, attention is paid to one straight line among the multiple straight lines of the inner wall E11. The width of the first portion B11 in the left-right direction (second orthogonal direction) has a first portion maximum width value A11, a first portion minimum width value A12, and a first portion intermediate width value A13. The first portion intermediate width value A13 is smaller than the first portion maximum width value A11, and is larger than the first portion minimum width value A12. Here, a first portion maximum width portion P11, a first portion minimum width portion P12, and a first portion intermediate width portion P13 are defined as follows.

First portion maximum width portion P11: a portion of the first portion B11 at which the width of the first portion B11 in the left-right direction (second orthogonal direction) has the first portion maximum width value A11.

First portion minimum width portion P12: a portion of the first portion B11 at which the width of the first portion B11 in the left-right direction (second orthogonal direction) has the first portion minimum width value A12.

First portion intermediate width portion P13: a portion of the first portion B11 at which the width of the first portion B11 in the left-right direction (second orthogonal direction) has the first portion intermediate width value A13.

The first portion intermediate width portion P13 is positioned between the first portion maximum width portion P11 and the first portion minimum width portion P12 in the front-back direction. In the present preferred embodiment, the width of the first portion B11 in the left-right direction (second orthogonal direction) continuously increases between the first portion minimum width portion P12 and the first portion maximum width portion P11. Accordingly, the first portion intermediate width portion P13 is a section between the first portion minimum width portion P12 and the first portion maximum width portion P11 as illustrated in a graph of FIG. 3.

Note that the inner wall E11 has a zigzag shape in which multiple straight lines are combined. Therefore, the first portion maximum width portion P11, the first portion minimum width portion P12, and the first portion intermediate width portion P13 may also be defined for other multiple straight lines of the inner wall E11.

Next, a structure of the third portion B13 will be described in more detail. The third portion B13 has a structure symmetrical to the first portion B11 in the left-right direction. More specifically, the third portion B13 is a portion of the hollow portion H1 positioned to the right (third orthogonal direction opposite to second orthogonal direction) of the signal conductor layer 22 when viewed in the up-down direction (first orthogonal direction). As described above, the inner wall E11 on the left side of the hollow portion H1 and the inner wall E13 on the right side of the hollow portion H1 each have a zigzag shape as illustrated in FIG. 3. Accordingly, the third portion B13 has a third periodic structure in which a width of the third portion B13 in the left-right direction (third orthogonal direction) periodically changes with a predetermined distance in the front-back direction. The period of the third periodic structure of the third portion B13 is equal to the period of the first periodic structure of the first portion B11. Hereinafter, the width of the third portion B13 in the left-right direction (third orthogonal direction) will be described in detail.

The inner wall E13 has a zigzag shape in which multiple straight lines are combined. Therefore, attention is paid to one straight line among the multiple straight lines of the inner wall E13. The width of the third portion B13 in the left-right direction (third orthogonal direction) has a third portion maximum width value A31, a third portion minimum width value A32, and a third portion intermediate width value A33. The third portion intermediate width value A33 is smaller than the third portion maximum width value A31, and is larger than the third portion minimum width value A32. Here, as illustrated in FIG. 3, a third portion maximum width portion P31, a third portion minimum width portion P32, and a third portion intermediate width portion P33 are defined as follows.

Third portion maximum width portion P31: a portion of the third portion B13 at which the width of the third portion B13 in the left-right direction (third orthogonal direction) has the third portion maximum width value A31.

Third portion minimum width portion P32: a portion of the third portion B13 at which the width of the third portion B13 in the left-right direction (third orthogonal direction) has the third portion minimum width value A32.

Third portion intermediate width portion P33: a portion of the third portion B13 at which the width of the third portion B13 in the left-right direction (third orthogonal direction) has the third portion intermediate width value A33.

The third portion intermediate width portion P33 is positioned between the third portion maximum width portion P31 and the third portion minimum width portion P32 in the front-back direction. In the present preferred embodiment, the width of the third portion B13 in the left-right direction (third orthogonal direction) continuously increases between the third portion minimum width portion P32 and the third portion maximum width portion P31. Accordingly, the third portion intermediate width portion P33 is a section between the third portion minimum width portion P32 and the third portion maximum width portion P31.

Note that the inner wall E13 has a zigzag shape in which multiple straight lines are combined. Therefore, the third portion maximum width portion P31, the third portion minimum width portion P32, and the third portion intermediate width portion P33 may also be defined for other multiple straight lines of the inner wall E13.

A phase of the first periodic structure of the first portion B11 and a phase of the third periodic structure of the third portion B13 as described above coincide with each other. Accordingly, positions of the multiple first portion maximum width portions P11 in the front-back direction coincide with positions of the multiple third portion maximum width portions P31 in the front-back direction, respectively.

Positions of the multiple first portion minimum width portions P12 in the front-back direction coincide with positions of the multiple third portion minimum width portions P32 in the front-back direction, respectively. As a result, characteristic impedance portions p11, p12, p13, p31, p32, p33 generated in the signal conductor layer 22 changes as described below.

The characteristic impedance generated in the signal conductor layer 22 depends on the width of the first portion B11 in the left-right direction and the width of the third portion B13 in the left-right direction. Accordingly, the characteristic impedance generated in the signal conductor layer 22 changes following the zigzag shape of the inner walls E11 and E13. That is, the characteristic impedance generated in the signal conductor layer 22 changes to have a zigzag shape as illustrated in the graph of FIG. 3.

The characteristic impedance generated in the signal conductor layer 22 has a maximum characteristic impedance value I11, a minimum characteristic impedance value I12, and an intermediate characteristic impedance value I13 in a section along the hollow portion H1. The intermediate characteristic impedance value I13 is smaller than the maximum characteristic impedance value I11, and is larger than the minimum characteristic impedance value I12. Here, a maximum characteristic impedance portion p11, a minimum characteristic impedance portion p12, and an intermediate characteristic impedance portion p13 are defined as follows.

Maximum characteristic impedance portion p11: a portion of the signal conductor layer 22 at which the characteristic impedance generated in the signal conductor layer 22 has the maximum characteristic impedance value I11.

Minimum characteristic impedance portion p12: a portion of the signal conductor layer 22 at which the characteristic impedance generated in the signal conductor layer 22 has the minimum characteristic impedance value I12.

Intermediate characteristic impedance portion p13: a portion of the signal conductor layer 22 at which the characteristic impedance generated in the signal conductor layer 22 has the intermediate characteristic impedance value I13.

The intermediate characteristic impedance portion p13 is positioned between the maximum characteristic impedance portion p11 and the minimum characteristic impedance portion p12 in the front-back direction. Further, the characteristic impedance generated in the signal conductor layer 22 continuously increases between the minimum characteristic impedance portion p12 and the maximum characteristic impedance portion p11. Accordingly, the intermediate characteristic impedance portion p13 is a section between the minimum characteristic impedance portion p12 and the maximum characteristic impedance portion p11 as illustrated in the graph of FIG. 3.

Positions of the multiple maximum characteristic impedance portions p11 in the front-back direction coincide with the positions of the multiple first portion maximum width portions P11 in the front-back direction and the positions of the multiple third portion maximum width portions P31 in the front-back direction, respectively. Positions of the multiple minimum characteristic impedance portions p12 in the front-back direction coincide with the positions of the multiple first portion minimum width portions P12 in the front-back direction and the positions of the multiple third portion minimum width portions P32 in the front-back direction, respectively. Positions of the intermediate characteristic impedance portions p13 in the front-back direction coincide with the positions of the multiple first portion intermediate width portions P13 in the front-back direction and the positions of the multiple third portion intermediate width portions P33 in the front-back direction, respectively.

The hollow portion H2 has a structure symmetrical to the hollow portion H1 in the up-down direction. Accordingly, a description of the structure of the hollow portion H2 is omitted. Note that the hollow portions H1 and H2 are formed by etching the insulation layers 18*a* and 18*b*, as illustrated in FIGS. 1 and 2. The hollow portions H1 and H2 may be formed by irradiating the insulation layers 18*a* and 18*b* with a laser beam, or may be formed by processing the insulation layers 18*a* and 18*b* using a mold or a router.

The positional relationship between the multiple interlayer connection conductors v1 and v2, and the hollow portions H1 and H2 will be described. Positions of the multiple interlayer connection conductors v1 in the front-back direction coincide with the positions of the multiple first portion minimum width portions P12 in the front-back direction as illustrated in FIG. 3. Further, positions of the multiple interlayer connection conductors v2 in the front-back direction coincide with the positions of the multiple third portion minimum width portions P32 in the front-back direction as illustrated in FIG. 3.

Structure of Electronic Device

Next, a structure of an electronic device 1 including the transmission line 10 will be described with reference to the drawings.

Figure 4:
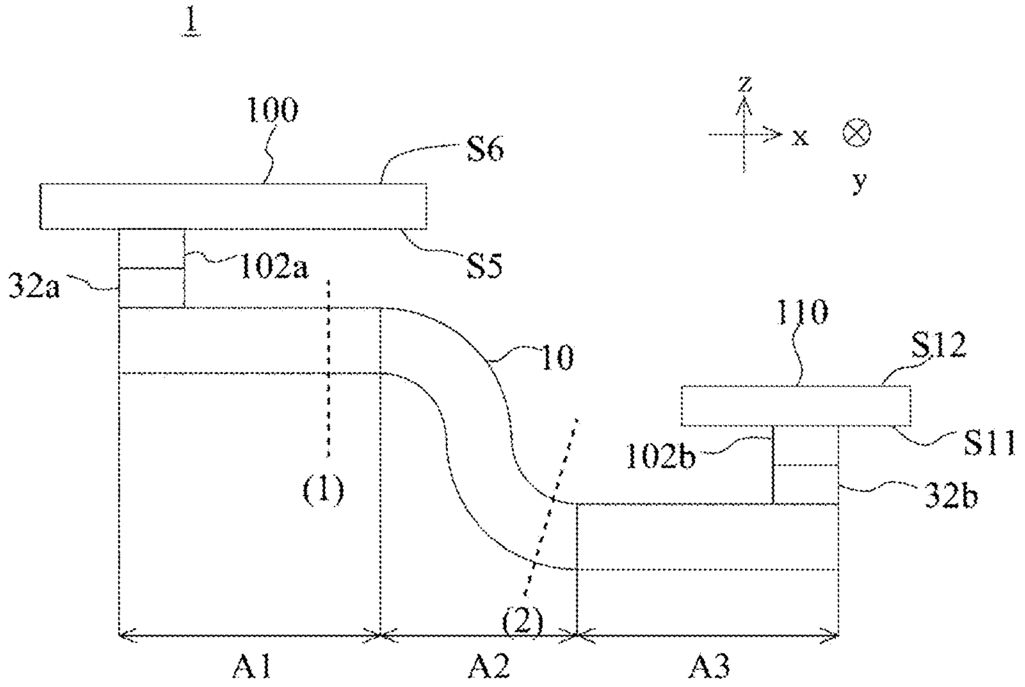
FIG. 4 is a left side view of an electronic device including the transmission line.
Figure 4:
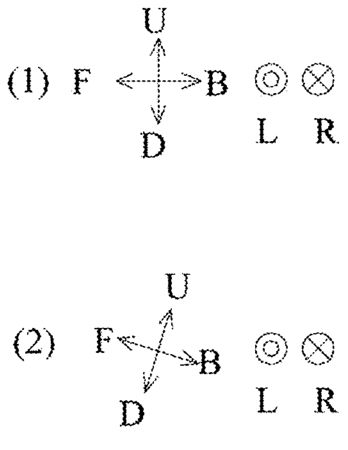

FIG. 4 is a left side view of the electronic device 1 including the transmission line 10. The electronic device 1 is a portable wireless communication terminal, for example. The electronic device 1 is a smartphone, for example.

The transmission line 10 is bent as illustrated in FIG. 4. "The transmission line 10 is bent" means that the transmission line 10 is deformed and bent by an external force being applied to the transmission line 10. Hereinafter, a section in which the transmission line 10 is bent is referred to as a "bent section" A2. Sections in which the transmission line 10 is not bent are referred to as "non-bent sections" A1 and A3. Then, an x-axis, a y-axis, and a z-axis in the electronic device 1 are defined as follows. The x-axis is the front-back direction in the non-bent section A1. The y-axis is the left-right direction in the non-bent section A1. The z-axis is the up-down direction in the non-bent section A1. The non-bent section A1, the bent section A2, and the non-bent section A3 are arranged in this order toward a positive direction of the x-axis.

The bent section A2 is bent in the z-axis direction as illustrated in FIG. 4. Accordingly, the up-down direction and the front-back direction differ depending on a position of the transmission line 10 as illustrated in FIG. 4. In the non-bent section A1 and the non-bent section A3 (position (1), for example) where the multilayer body 12 (FIGS. 1 and 2) is not bent, the up-down direction and the front-back direction coincide with the z-axis direction and the x-axis direction, respectively. On the other hand, in the bent section A2 (position (2), for example) where the multilayer body 12 is bent, the up-down direction and the front-back direction do not coincide with the z-axis direction and the x-axis direction, respectively.

The electronic device 1 includes the transmission line 10, connectors 32*a*, 32*b*, 102*a*, and 102*b*, and circuit substrates 100 and 110 as illustrated in FIG. 4.

The circuit substrates 100 and 110 each have a plate shape. The circuit substrate 100 includes main surfaces S5 and S6. The main surface S5 is positioned on a negative direction side of the z-axis relative to the main surface S6. The circuit substrate 110 includes main surfaces S11 and S12. The main surface S11 is positioned on the negative direction side of the z-axis relative to the main surface S12. The circuit substrates 100 and 110 each include a wiring conductor layer, a ground conductor layer, an electrode, and the like (not illustrated).

The connectors 32*a* and 32*b* are mounted on a main surface (upper main surface) on a positive direction side of the z-axis, in the non-bent section A1 and in the non-bent section A3, respectively. More specifically, the connector 32*a* is mounted on the signal terminal 28*a* (FIG. 1) and the ground terminals 29*a* and 30*a* (FIG. 1) that are exposed from the openings h1 to h3 (FIG. 1).

The connector 32*b* is mounted on the signal terminal 28*b* and the ground terminals 29*b* and 30*b* that are exposed from the openings h4 to h6 (FIG. 1).

The connectors 102*a* and 102*b* are mounted on the main surface S5 of the circuit substrate 100 and on the main surface S11 of the circuit substrate 110, respectively. The connectors 102*a* and 102*b* are connected to the connectors 32*a* and 32*b*, respectively. Thus, the transmission line 10 electrically connects the circuit substrate 100 and the circuit substrate 110.

Effects

With the use of the transmission line 10, a rapid change in the characteristic impedance generated in the signal conductor layer 22 (FIGS. 1 and 2) may be prevented or reduced. More specifically, the first portion maximum width portion P11 (FIG. 3) is a portion of the first portion B11 (FIG. 3) at which the width of the first portion B11 in the left-right direction (second orthogonal direction) has the first portion maximum width value A11 (FIG. 3). Accordingly, the characteristic impedance generated in the signal conductor layer 22 may have a maximum value at the first portion maximum width portion P11. The first portion minimum width portion P12 (FIG. 3) is a portion of the first portion B11 at which the width of the first portion B11 in the left-right direction (second orthogonal direction) has the first portion minimum width value A12 (FIG. 3). Accordingly, the characteristic impedance generated in the signal conductor layer 22 may have a minimum value at the first portion minimum width portion P12. The first portion intermediate width portion P13 (FIG. 3) is a portion of the first portion B11 at which the width of the first portion B11 in the left-right direction (second orthogonal direction) has the first portion intermediate width value A13 (FIG. 3). Accordingly, the characteristic impedance generated in the signal conductor layer 22 may take an intermediate value in the first portion intermediate width portion P13. Then, the first portion intermediate width portion P13 is positioned between the first portion maximum width portion P11 and the first portion minimum width portion P12 in the front-back direction. As a result, the amount of air present around the signal conductor layer 22 between the first portion maximum width portion P11 and the first portion minimum width portion P12 changes as a maximum value, an intermediate value, and a minimum value. The magnitude of capacitance generated between the signal conductor layer 22 and the first ground conductor layer 24 and/or the magnitude of capacitance generated between the signal conductor layer 22 and the second ground conductor layer 26 changes as a maximum value, an intermediate value, and a minimum value. Accordingly, the characteristic impedance generated in the signal conductor layer 22 changes as a maximum value, an intermediate value, and a minimum value. That is, the characteristic impedance generated in the signal conductor layer 22 does not change from the maximum value to the minimum value without taking the intermediate value. Therefore, the change of the characteristic impedance generated in the signal conductor layer 22 becomes moderate. As described above, with the use of the transmission line 10, a rapid change in the characteristic impedance generated in the signal conductor layer 22 may be prevented or reduced.

With the use of the transmission line 10, deformation of the hollow portion H1 may be prevented or reduced. The first portion intermediate width portion P13 is positioned between the first portion maximum width portion P11 and the first portion minimum width portion P12 in the front-back direction. Therefore, the hollow portion H1 has a portion at which a width is large in the left-right direction, a portion at which a width is small in the left-right direction, and a portion connecting these portions. The hollow portion H1 is less likely to be deformed in the portion at which a width is small in the left-right direction. As a result, deformation of the portion of the hollow portion H1 at which a width is large in the left-right direction is prevented by the portion of the hollow portion H1 at which a width is small in the left-right direction. That is, deformation of the entire hollow portion H1 is prevented or reduced.

With the use of the transmission line 10, transmission loss of the transmission line 10 may be reduced. More specifically, the insulation layer 18*a* is provided with the hollow portion H1 penetrating through the insulation layer 18*a* in the up-down direction. Air having a low dielectric constant and a low dielectric dissipation factor is present in the hollow portion H1. Therefore, a dielectric constant and a dielectric dissipation factor around the signal conductor layer 22 are lowered. As a result, occurrence of dielectric loss in a radio frequency signal transmitted through the signal conductor layer 22 is prevented or reduced in the transmission line 10, and thus the transmission loss of the transmission line 10 is reduced. The hollow portion H2 also contributes to reduction in the transmission loss of the transmission line 10 for the same reason as the hollow portion H1. As illustrated in FIGS. 1-3, the hollow portion H2 includes an inner walls E21 and E23 that configured similar to the inner walls E11 and E13 of the hollow portion H1.

No opening is provided in the first ground conductor layer 24 in the transmission line 10. With this configuration, when a metal body is brought close to the transmission line 10, capacitance is less likely to be generated between the signal conductor layer 22 and the metal body. As a result, the characteristic impedance generated in the signal conductor layer 22 is less likely to fluctuate.

No opening is provided in the first ground conductor layer 24 in the transmission line 10. With this configuration, radiation of an electromagnetic wave from the signal conductor layer 22 to the outside of the transmission line 10 is prevented or reduced. As a result, loss due to radiation of an electromagnetic wave is less likely to occur in a radio frequency signal transmitted through the signal conductor layer 22.

With the use of the transmission line 10, the interlayer connection conductor v1 is easily formed. More specifically, in the first portion minimum width portion P12, a width of the first portion B11 in the left-right direction is small. Therefore, a space for forming the interlayer connection conductor v1 is easily ensured. Thus, the positions of the interlayer connection conductor v1 in the front-back direction coincide with the positions of the first portion minimum width portion P12 in the front-back direction. With this configuration, the interlayer connection conductor v1 may easily be formed in the transmission line 10. The interlayer connection conductor v2 may easily be formed for the same reason.

First Modification

Figure 5:
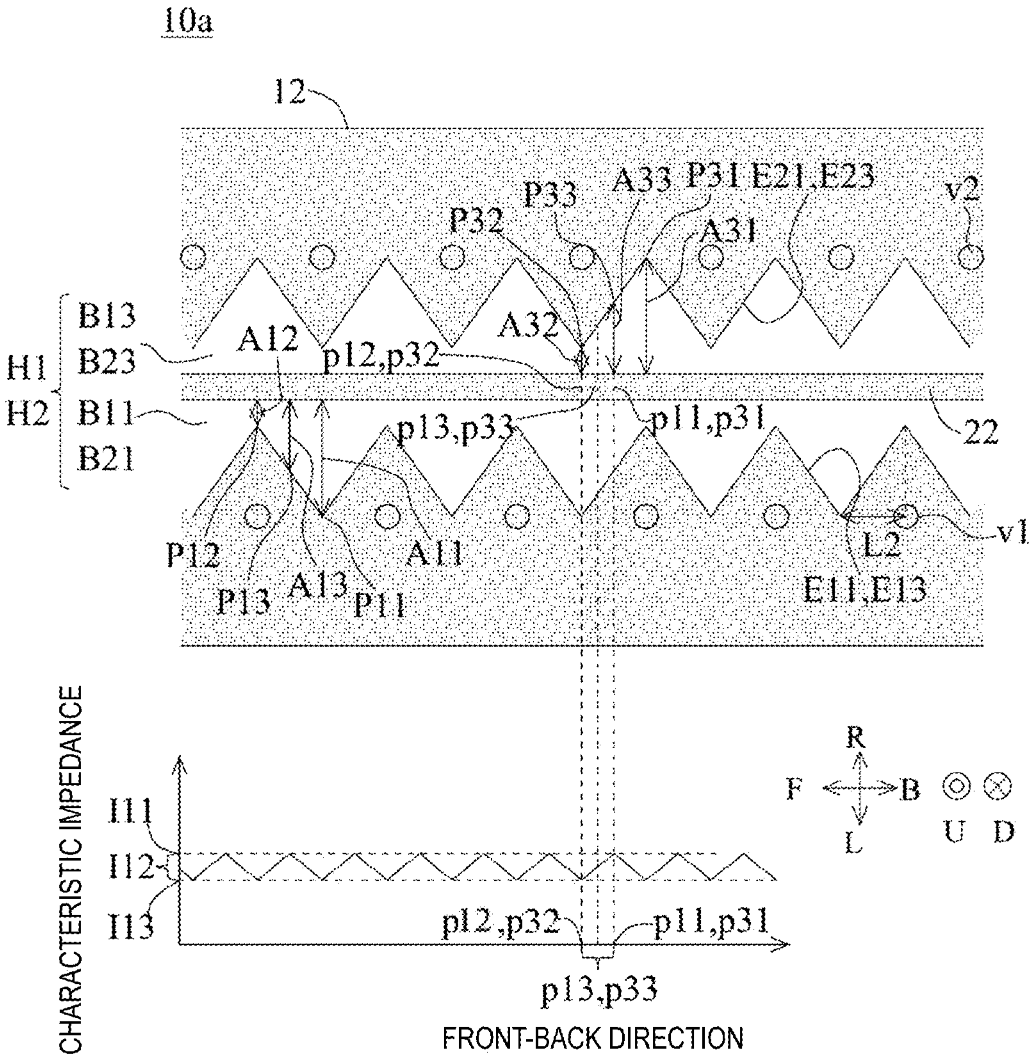
FIG. 5 is a perspective view of a transmission line in the up-down direction.

Hereinafter, a transmission line 10*a* according to a first modification of a preferred embodiment of the present invention will be described with reference to the drawings. FIG. 5 is a perspective view of the transmission line 10*a* in the up-down direction. Note that, in the transmission line 10*a*, adhesive layers of the insulation layers 18*a* and 18*b* are omitted. In the transmission lines 10*b* to 10*p* described later, the adhesive layers of the insulation layers 18*a* and 18*b* are omitted.

The transmission line 10*a* differs from the transmission line 10 in a shape of each of hollow portions H1 and H2. More specifically, the phase of the first periodic structure of the first portion B11 and the phase of the third periodic structure of the third portion B13 are shifted from each other by a half period. Accordingly, the positions of the multiple first portion maximum width portions P11 in the front-back direction coincide with the positions of the multiple third portion minimum width portions P32 in the front-back direction, respectively. The positions of the multiple first portion minimum width portions P12 in the front-back direction coincide with the positions of the multiple third portion maximum width portions P31 in the front-back direction, respectively. Since the hollow portion H2 has a structure symmetrical to the hollow portion H1 in the up-down direction, a description thereof will be omitted. Further, since the other structures of the transmission line 10*a* are the same as those of the transmission line 10, a description thereof is omitted.

A period of a change in the characteristic impedance generated in the signal conductor layer 22 in the transmission line 10*a* is half a period of a change in the characteristic impedance generated in the signal conductor layer 22 in the transmission line 10. Specifically, in the transmission line 10, a length L1 (FIG. 3) in the front-back direction of two straight lines of the inner wall E11 of the zigzag shape is the period of the change in the characteristic impedance generated in the signal conductor layer 22. On the other hand, a length L2 in the front-back direction of one straight line of the inner wall E11 of the zigzag shape is the period of the change in the characteristic impedance generated in the signal conductor layer 22. With this configuration, a frequency of a standing wave generated by reflection in the transmission line 10*a* is twice a frequency of a standing wave generated by reflection in the transmission line 10. Therefore, the frequency of the standing wave becomes apart from a frequency of a radio frequency signal transmitted through the signal conductor layer 22. As a result, transmission loss of a radio frequency signal caused by reflection is reduced in the transmission line 10*a*.

Further, in the transmission line 10*a*, a change in the sum of the width of the first portion B11 in the left-right direction and the width of the third portion in the left-right direction is smaller than that in the transmission line 10. Therefore, a change in the characteristic impedance generated in the signal conductor layer 22 is decreased, and thus reflection of a radio frequency signal in the signal conductor layer 22 is reduced or prevented.

With the use of the transmission line 10*a*, deformation of each of the hollow portions H1 and H2 may be prevented or reduced in addition to the effect of the transmission line 10. More specifically, in the structure of the transmission line 10, the period of changes in a width of each of the hollow portions H1 and H2 in the left-right direction is the length L1. In the structure of the transmission line 10*a*, the period of changes in the width of each of the hollow portions H1 and H2 in the left-right direction is the length L2. The length L2 is about one half the length L1.

As described above, when the period of the change in the width of each of the hollow portions H1 and H2 in the left-right direction is shortened, a length of a portion of each of the hollow portions H1 and H2 having a large width in the left-right direction is shortened. When the portion of each of the hollow portions H1 and H2 having a large width in the left-right direction becomes short, the hollow portions H1 and H2 each are less likely to be deformed.

Second Modification

Figure 6:
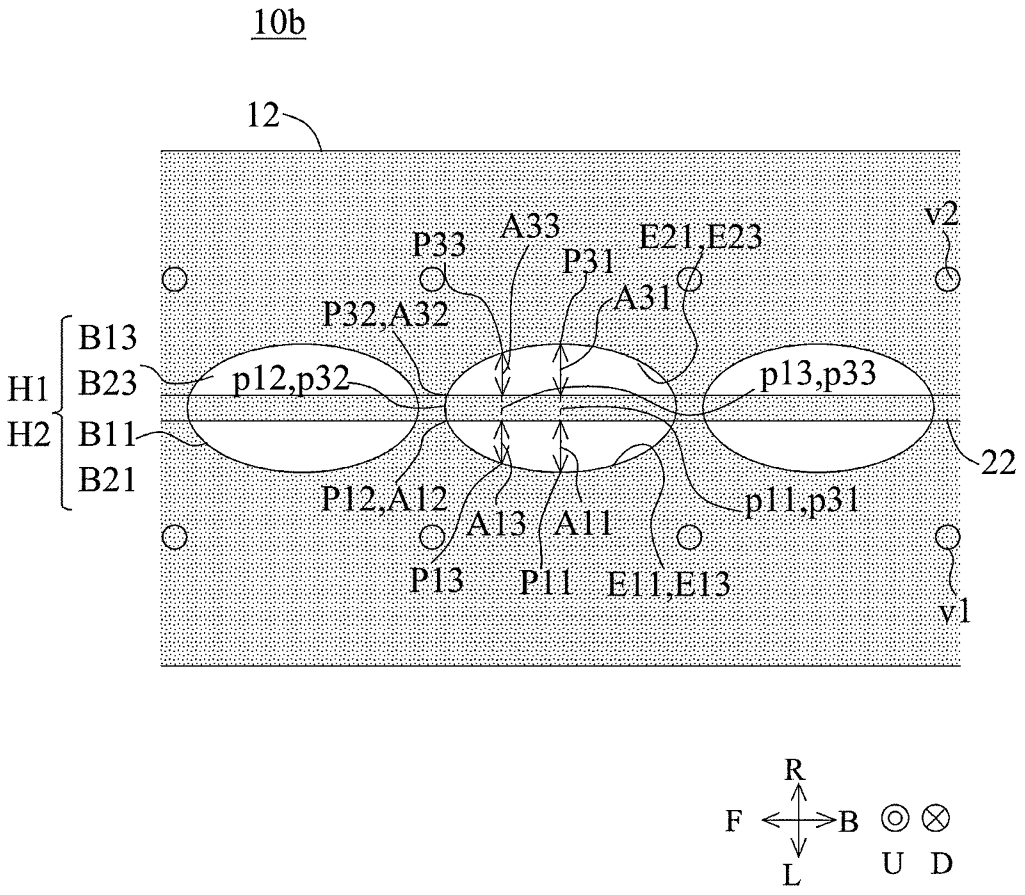
FIG. 6 is a perspective view of a transmission line in the up-down direction.

Hereinafter, a transmission line 10*b* according to a second modification of a preferred embodiment of the present invention will be described with reference to the drawings. FIG. 6 is a perspective view of the transmission line 10*b* in the up-down direction.

The transmission line 10*b* differs from the transmission line 10 in a shape of each of hollow portions H1 and H2. More specifically, in the transmission line 10*b*, the multiple hollow portions H1 are provided in the multilayer body 12. Each of the multiple hollow portions H1 has an elliptical shape having a major axis extending in the front-back direction when viewed in the up-down direction.

Accordingly, a width of each of the multiple hollow portions H1 in the left-right direction continuously changes. Further, the multiple hollow portions H1 are arranged at equal or substantially equal intervals in the front-back direction when viewed in the up-down direction.

In a first portion B11 of the transmission line 10*b*, a front end of the first portion B11 or a back end of the first portion B11 is the first portion minimum width portion P12. A midpoint between the front end of the first portion B11 and the back end of the first portion B11 is the first portion maximum width portion P11. Further, in a third portion B13 of the transmission line 10*b*, the front end of the third portion B13 or the back end of the third portion B13 is the third portion minimum width portion P32.

The midpoint between the front end of the third portion B13 and the back end of the third portion B13 is the third portion maximum width portion P31. Note that, since the hollow portion H2 has a structure symmetrical to the hollow portion H1 in the up-down direction, a description thereof will be omitted. Further, since the other structures of the transmission line 10*b* are the same as those of the transmission line 10, a description thereof is omitted. The transmission line 10*b* may achieve the same effect as the transmission line 10.

In the transmission line 10*b*, a portion of the insulation layer 18*a* is present between the multiple hollow portions H1. Similarly, a portion of the insulation layer 18*b* is present between the multiple hollow portions H2. Each of portions of the insulation layers 18*a* and 18*b* functions as a support. Therefore, deformation of each of the multiple hollow portions H1 and H2 is prevented or reduced.

Third Modification

Figure 7:
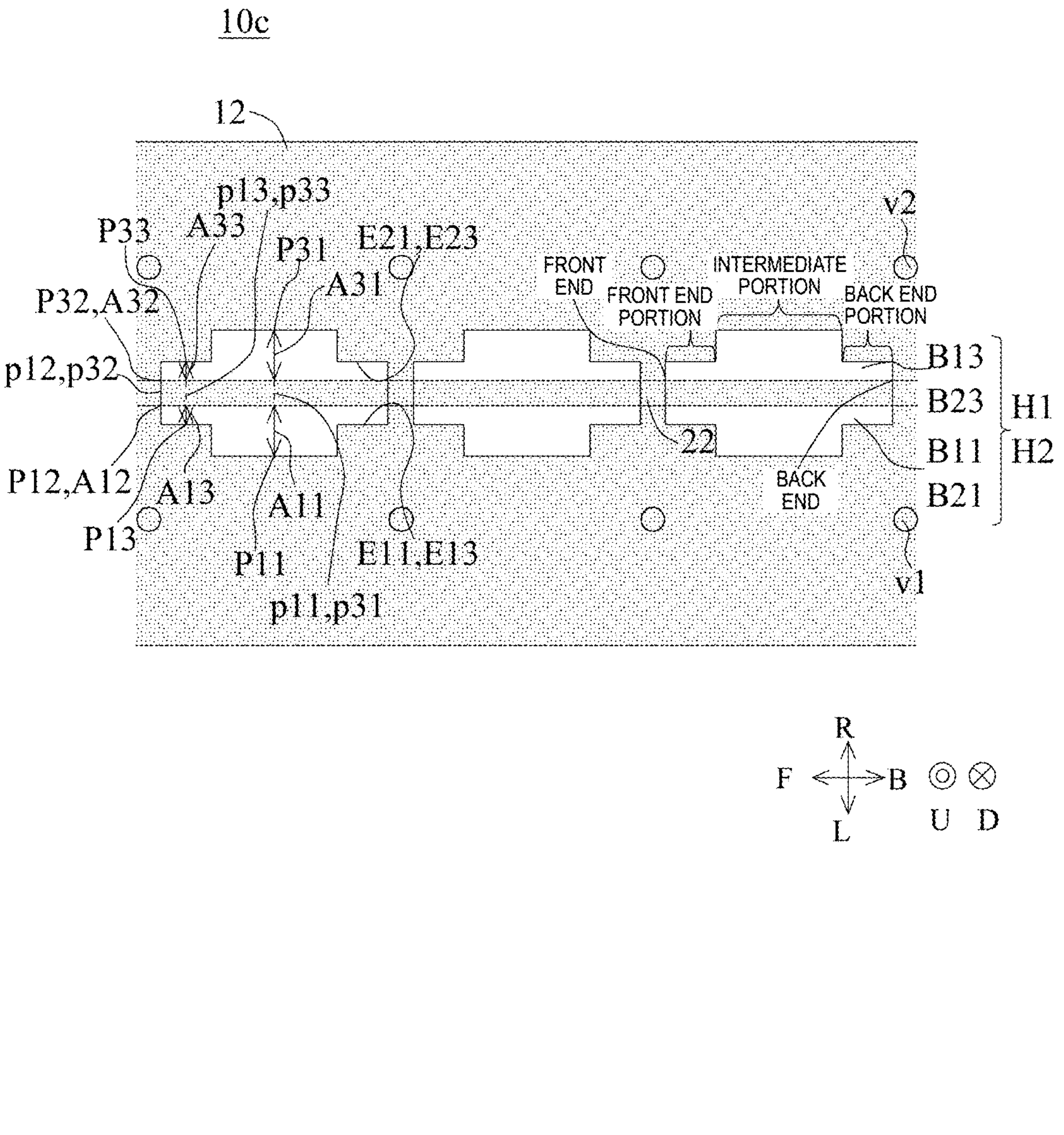
FIG. 7 is a perspective view of a transmission line in the up-down direction.

Hereinafter, a transmission line 10*c* according to a third modification of a preferred embodiment of the present invention will be described with reference to the drawings. FIG. 7 is a perspective view of the transmission line 10*c* in the up-down direction.

The transmission line 10*c* differs from the transmission line 10*b* in a shape of each of hollow portions H1 and H2. More specifically, a width of the hollow portion H1 in the left-right direction changes discontinuously. More specifically, in the hollow portion H1, a width of the front end portion in the left-right direction and a width of the back end portion in the left-right direction are smaller than a width of the intermediate portion in the left-right direction.

In a first portion B11 of the transmission line 10*c*, a front end of the first portion B11 or a back end of the first portion B11 is the first portion minimum width portion P12. An intermediate portion of the first portion B11 is the first portion maximum width portion P11. In a third portion B13, a front end of the third portion B13 or a back end of the third portion B13 is the third portion minimum width portion P32. An intermediate portion of the third portion B13 is the third portion maximum width portion P31. Note that, since the hollow portion H2 has a structure symmetrical to the hollow portion H1 in the up-down direction, a description thereof will be omitted. Further, since the other structures of the transmission line 10*c* are the same as those of the transmission line 10*b*, a description thereof will be omitted. The transmission line 10*c* may achieve the same effect as the transmission line 10*b*.

Fourth Modification

Figure 8:
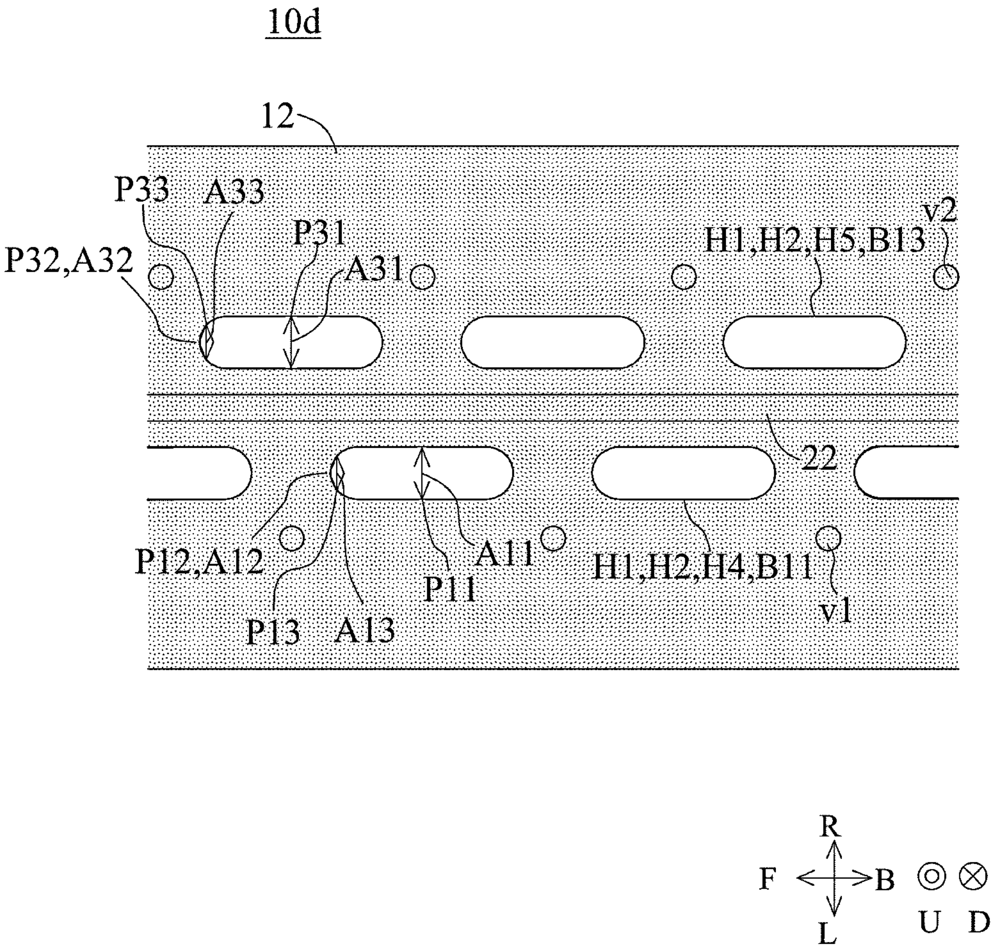
FIG. 8 is a perspective view of a transmission line in the up-down direction.

Hereinafter, a transmission line 10*d* according to a fourth modification of a preferred embodiment of the present invention will be described with reference to the drawings. FIG. 8 is a perspective view of the transmission line 10*d* in the up-down direction.

The transmission line 10*d* differs from the transmission line 10*b* in a shape of each of hollow portions H1 and H2. More specifically, the multiple hollow portions H1 include multiple first hollow portions H4 and multiple second hollow portions H5. Each of the multiple first hollow portions H4 and the multiple second hollow portions H5 has a shape obtained by combining a rectangle and two semicircles when viewed in the up-down direction. Specifically, each of the multiple first hollow portions H4 and the multiple second hollow portions H5 has a shape in which a semicircle protruding in the front direction is connected to a front end of a rectangle and a semicircle protruding in the back direction is connected to a back end of the rectangle.

The multiple first hollow portions H4 are provided on the left of the signal conductor layer 22. Accordingly, as a result of the multiple first hollow portions H4 being provided on the left of the signal conductor layer 22, the multiple first hollow portions H4 each include a first portion B11 and do not include a third portion B13. The multiple first hollow portions H4 are arranged at equal or substantially equal intervals in the front-back direction.

The multiple second hollow portions H5 are provided on the right of the signal conductor layer 22. Accordingly, as a result of the multiple second hollow portions H5 being provided on the right of the signal conductor layer 22, the multiple second hollow portions H5 each include the third portion B13 and do not include the first portion B11. The multiple second hollow portions H5 are arranged at equal or substantially equal intervals in the front-back direction. Note that the multiple first hollow portions H4 and the multiple second hollow portions H5 are alternately arranged in the front-back direction. Since the hollow portion H2 has a structure symmetrical to the hollow portion H1 in the up-down direction, a description thereof will be omitted. Further, since the other structures of the transmission line 10*d* are the same as those of the transmission line 10*a*, a description thereof will be omitted. The transmission line 10*d* may achieve the same effect as the transmission line 10*a*.

With the use of the transmission line 10*d*, a loss of a radio frequency signal caused by reflection is reduced for the same reason as the transmission line 10*a*. Further, with the use of the transmission line 10*d*, deformation of each of the hollow portions H1 and H2 may be prevented or reduced for the same reason as the transmission line 10*a*.

Fifth Modification

Figure 9:
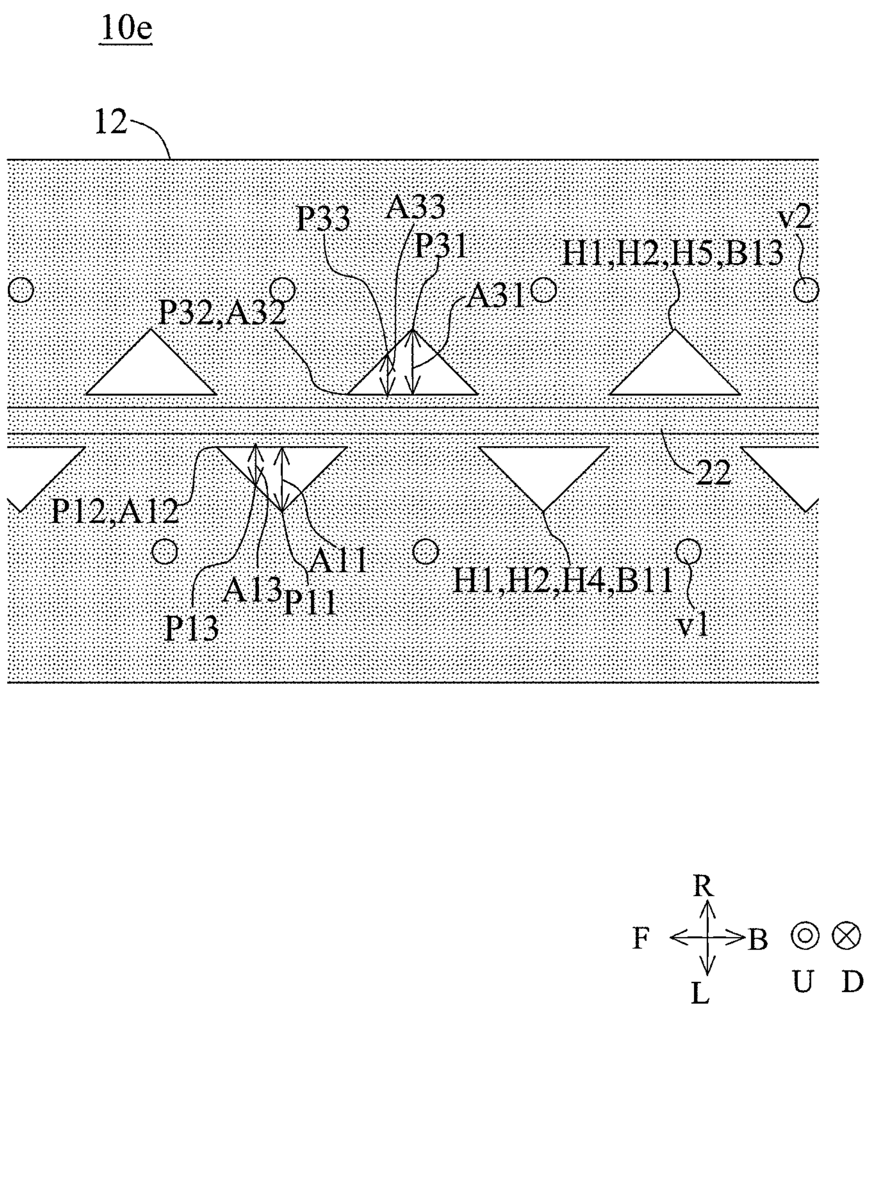
FIG. 9 is a perspective view of a transmission line in the up-down direction.

Hereinafter, a transmission line 10*e* according to a fifth modification of a preferred embodiment of the present invention will be described with reference to the drawings. FIG. 9 is a perspective view of the transmission line 10*e* in the up-down direction.

The transmission line 10*e* differs from the transmission line 10*d* in each of a shape of first hollow portion H4 and a shape of second hollow portion H5. More specifically, the first hollow portion H4 and the second hollow portion H5 each have an isosceles triangular shape. A bottom side of the first hollow portion H4 is parallel to the signal conductor layer 22. A vertex of the first hollow portion H4 is positioned to the left of the bottom side of the first hollow portion H4. The bottom side of the second hollow portion H5 is parallel to the signal conductor layer 22. A vertex of the second hollow portion H5 is positioned to the right of the bottom side of the second hollow portion H5. Since a hollow portion H2 has a structure symmetrical to a hollow portion H1 in the up-down direction, a description thereof will be omitted. Further, since the other structures of the transmission line 10*e* are the same as those of the transmission line 10*d*, a description thereof will be omitted. The transmission line 10*e* may achieve the same effect as the transmission line 10*d*.

In the transmission line 10*e*, a width of the first hollow portion H4 in the left-right direction and a width of the second hollow portion H5 in the left-right direction continuously change. As a result, characteristic impedance generated in the signal conductor layer 22 continuously changes as well.

Sixth Modification

Figure 10:
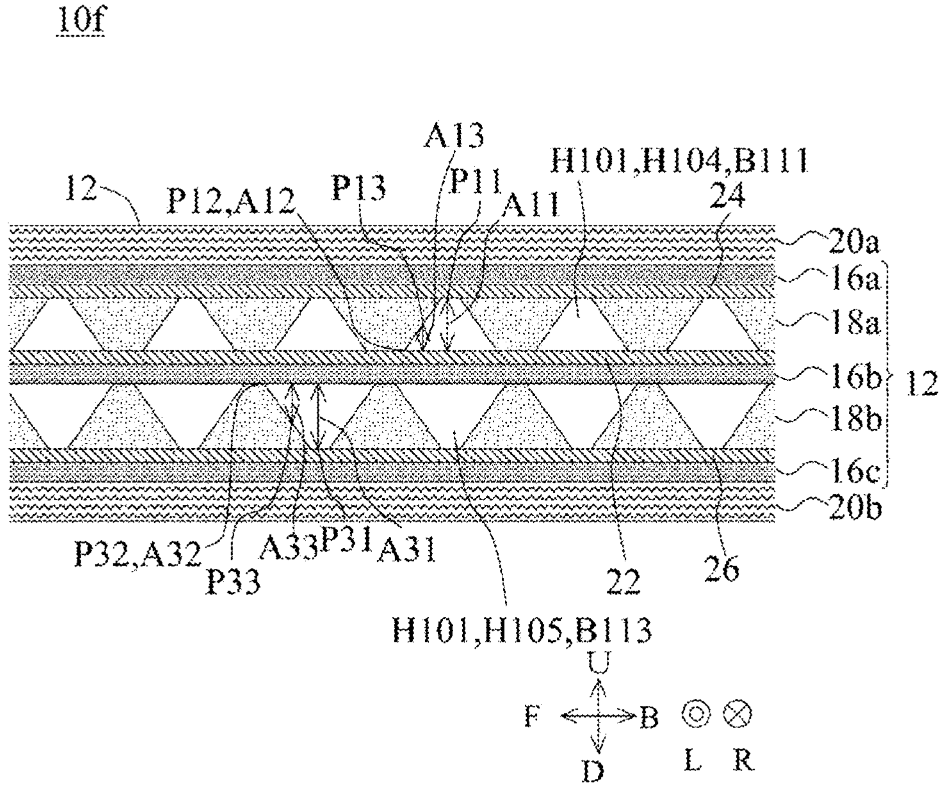
FIG. 10 is a sectional view of a transmission line perpendicular to a left-right direction.
Figure 11:
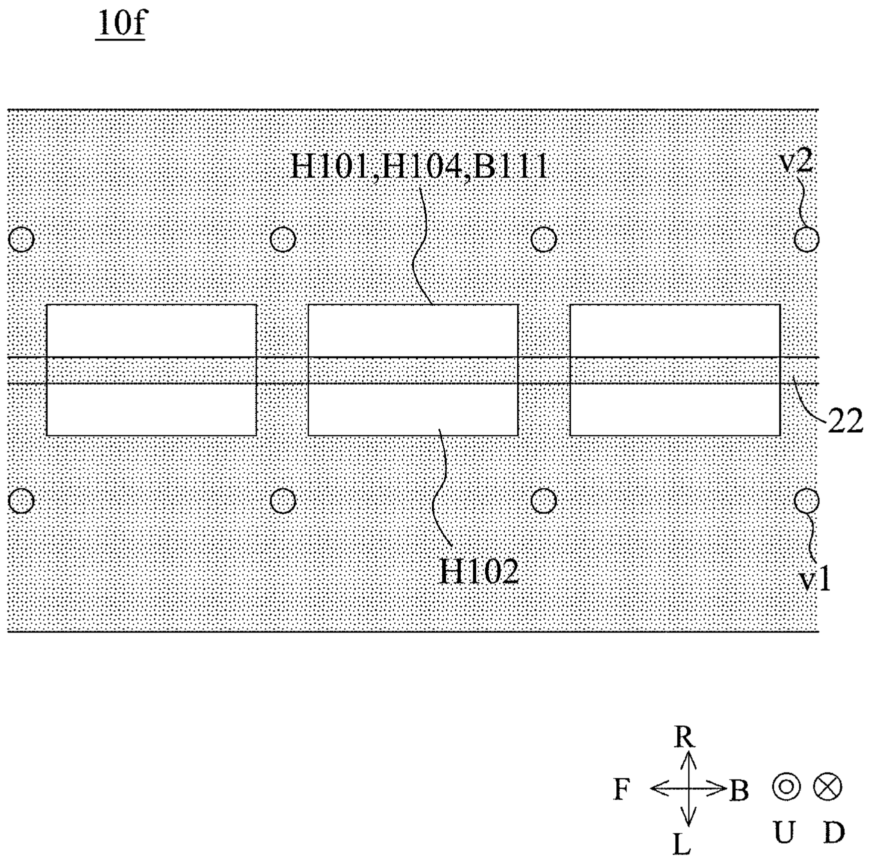
FIG. 11 is a perspective view of the transmission line in the up-down direction.
Figure 12:
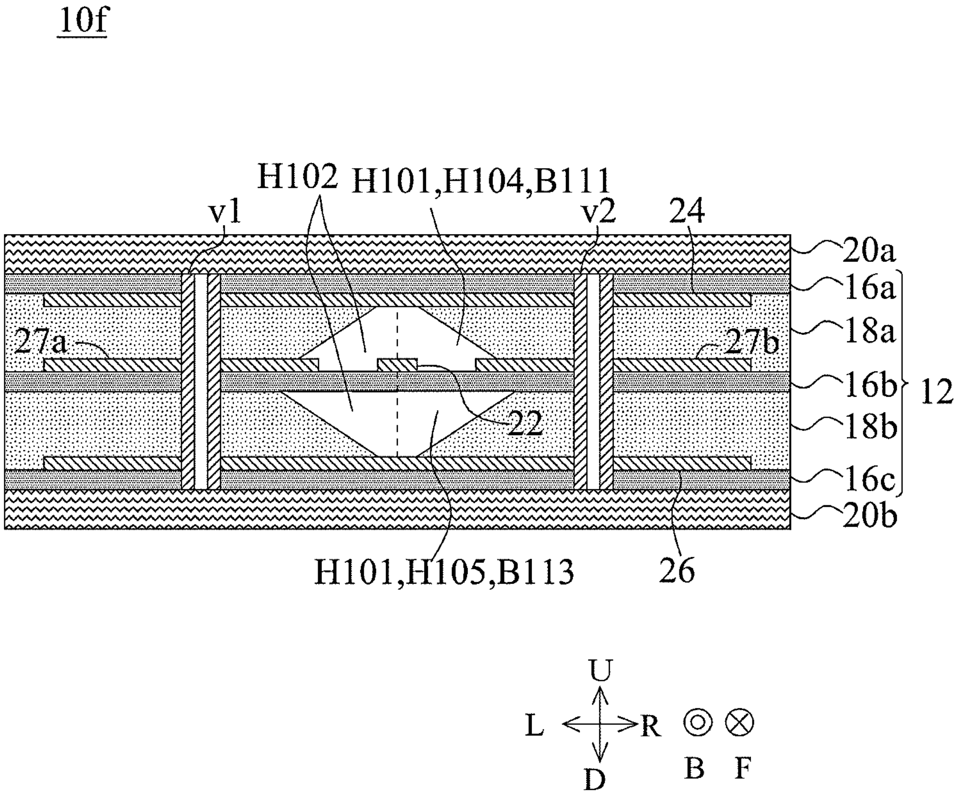
FIG. 12 is a sectional view of the transmission line perpendicular to a front-back direction.

Hereinafter, a transmission line 10*f* according to a sixth modification of a preferred embodiment of the present invention will be described with reference to the drawings. FIG. 10 is a sectional view of the transmission line 10*f* perpendicular to the left-right direction. FIG. 11 is a perspective view of the transmission line 10*f* in the up-down direction. FIG. 12 is a sectional view of the transmission line 10*f* perpendicular to the front-back direction.

In the transmission line 10*e*, the first orthogonal direction is the up-down direction, whereas in the transmission line 10*f*, the first orthogonal direction is the left-right direction.

Further, in the transmission line 10*e*, the second orthogonal direction is the left-right direction, whereas in the transmission line 10*f*, the second orthogonal direction is the up-down direction. Furthermore, hollow portions H101 and H102 (FIGS. 11 and 12), a first hollow portion H104, a second hollow portion H105 (FIGS. 11 and 12), a first portion B111, and a third portion B113 (FIGS. 11 and 12), in the transmission line 10*f* correspond to the hollow portions H1 and H2, the first hollow portion H4, the second hollow portion H5, the first portion B11, and the third portion B13 in the transmission line 10*e*.

In the transmission line 10*e*, the hollow portion H1 includes the first hollow portion H4 (first portion B11) positioned on the left (second orthogonal direction) of the signal conductor layer 22, when viewed in the up-down direction (first orthogonal direction). The hollow portion H1 includes the second hollow portion H5 (third portion B13) positioned on the right (third orthogonal direction) of the signal conductor layer 22.

On the other hand, in the transmission line 10*f*, a hollow portion H101 includes a first hollow portion H104 (first portion B111) positioned on the signal conductor layer 22 (second orthogonal direction), when viewed in the left-right direction (first orthogonal direction). The hollow portion H101 includes a second hollow portion H105 (third portion B113) positioned under the signal conductor layer 22 (third orthogonal direction).

The first hollow portion H104 and the second hollow portion H105 each are a right half of a quadrangular pyramid shape. A vertex of the first hollow portion H104 is positioned above a bottom surface of the first hollow portion H104. A vertex of the second hollow portion H105 is positioned below a bottom surface of the second hollow portion H105. Accordingly, the first hollow portion H104 and the second hollow portion H105 have a triangular shape when viewed in the left-right direction as illustrated in FIG. 10. The first hollow portion H104 and the second hollow portion H105 each have a rectangular shape when viewed in the up-down direction as illustrated in FIG. 11. The first hollow portion H104 and the second hollow portion H105 each have a triangular shape when viewed in the front-back direction as illustrated in FIG. 12. Further, a hollow portion H102 has a structure symmetrical to the hollow portion H101 in the left-right direction. The transmission line 10*f* may achieve the same effect as the transmission line 10*e*.

With the use of the transmission line 10*f*, deformation of each of the first hollow portion H104 and the second hollow portion H105 is prevented or reduced. More specifically, the vertex of the first hollow portion H104 is positioned above the bottom surface of the first hollow portion H104. Therefore, a ratio of the first hollow portion H104 to the insulation layer 18*a* (FIGS. 10 and 12) is low in the vicinity of the first ground conductor layer 24 (FIGS. 10 and 12). This makes it difficult for the first ground conductor layer 24 to be deformed. Similarly, the vertex of the second hollow portion H105 is positioned below the bottom surface of the second hollow portion H105. Therefore, the ratio of the second hollow portion H105 to the insulation layer 18*b* (FIGS. 10 and 12) is low in the vicinity of the second ground conductor layer 26 (FIGS. 10 and 12). This makes it difficult for the second ground conductor layer 26 to be deformed. As a result, deformation of each of the first hollow portion H104 and the second hollow portion H105 is prevented or reduced.

Seventh Modification

Hereinafter, a transmission line 10*g* according to a seventh modification of a preferred embodiment of the present invention will be described with reference to the drawings.

Figure 13:
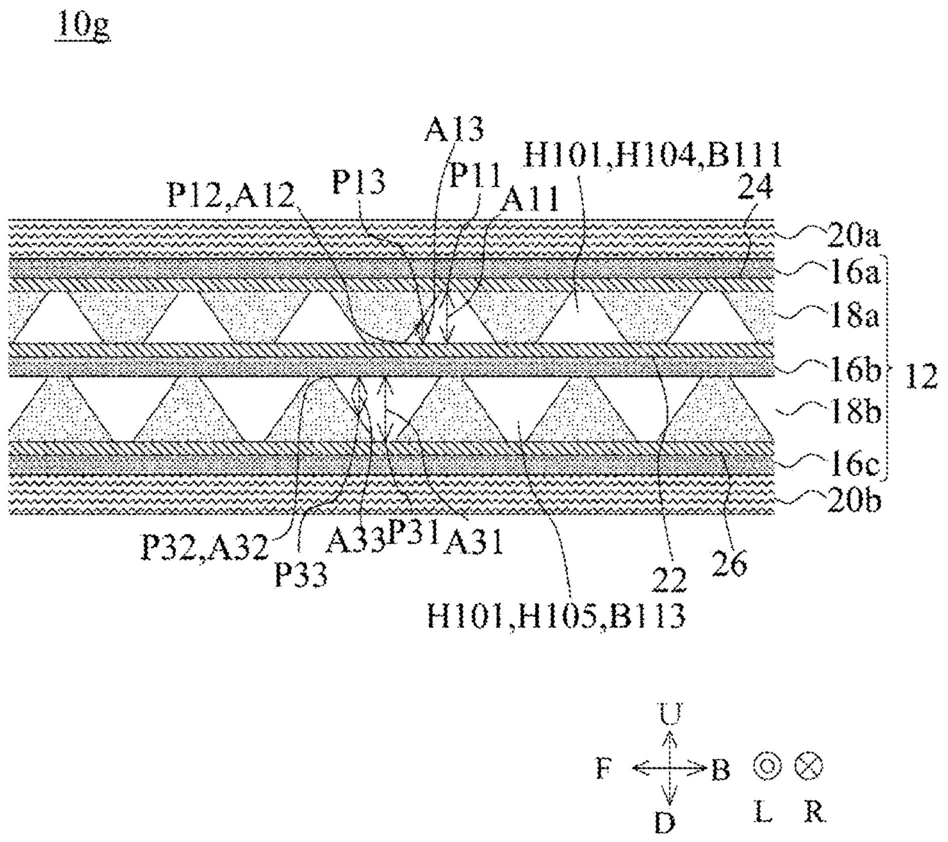
FIG. 13 is a sectional view of a transmission line perpendicular to the left-right direction.

FIG. 13 is a sectional view of the transmission line 10*g* perpendicular to the left-right direction.

In the transmission line 10*f*, the vertex of each of the multiple first hollow portions H104 is positioned above the vertex of each of the multiple second hollow portions H105. Accordingly, a phase of a periodic structure of the first hollow portion H104 and a phase of a periodic structure of the second hollow portion H105 coincide with each other. On the other hand, in the transmission line 10*g*, a vertex of each of multiple first hollow portions H104 is not positioned above a vertex of each of multiple second hollow portions H105. The multiple first hollow portions H104 and the multiple second hollow portions H105 are alternately arranged in the front-back direction. With this, a phase of the periodic structure of the first hollow portion H104 and a phase of the periodic structure of the second hollow portion H105 are shifted from each other by a half period. Since the other structures of the transmission line 10*g* are the same as those of the transmission line 10*f*, a description thereof will be omitted. The transmission line 10*g* may achieve the same effect as the transmission line 10*f*.

With the use of the transmission line 10*g*, loss of a radio frequency signal caused by reflection is reduced for the same reason as the transmission line 10*f*. Further, with the use of the transmission line 10*g*, deformation of each of the hollow portions H101 and H102 may be prevented or reduced for the same reason as the transmission line 10*f*.

Eighth Modification

Figure 14:
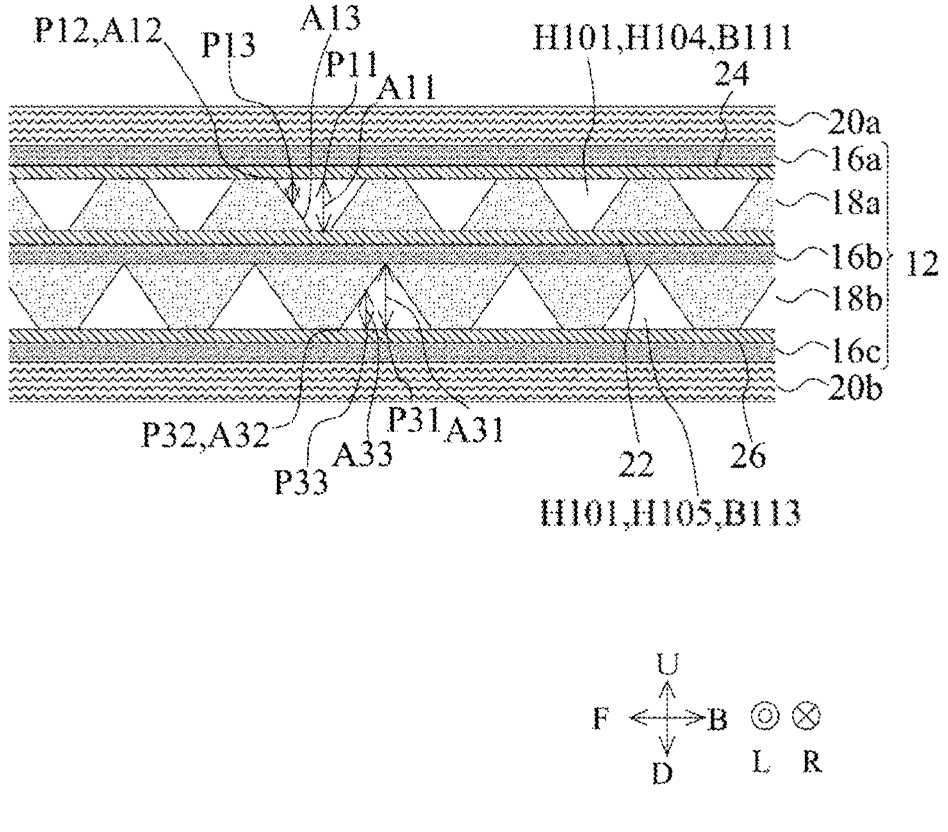
FIG. 14 is a sectional view of a transmission line perpendicular to the left-right direction.

Hereinafter, a transmission line 10*h* according to an eighth modification of a preferred embodiment of the present invention will be described with reference to the drawings. FIG. 14 is a sectional view of the transmission line 10*h* perpendicular to the left-right direction.

In the transmission line 10*g*, the vertex of each of the multiple first hollow portions H104 is positioned above the bottom surface of each of the multiple first hollow portions H104. Further, the vertex of each of the multiple second hollow portions H105 is positioned below the bottom surface of each of the multiple second hollow portions H105. On the other hand, in the transmission line 10*h*, a vertex of each of multiple first hollow portions H104 is positioned below a bottom surface of each of the multiple first hollow portions H104. Further, a vertex of each of multiple second hollow portions H105 is positioned above a bottom surface of each of the multiple second hollow portions H105. Since the other structures of the transmission line 10*h* are the same as those of the transmission line 10*g*, a description thereof will be omitted. The transmission line 10*h* may achieve the same effect as the transmission line 10*g*.

In the transmission line 10*h*, the vertex of the first hollow portion H104 is positioned below the bottom surface of the first hollow portion H104. Therefore, the ratio of the first hollow portion H104 to the insulation layer 18*a* is low in the vicinity of the signal conductor layer 22. Similarly, the vertex of the second hollow portion H105 is positioned above the bottom surface of the second hollow portion H105. Therefore, the ratio of the second hollow portion H105 to the insulation layer 18*b* is low in the vicinity of the signal conductor layer 22. Accordingly, the insulation layers 18*a* and 18*b* are present in large volume around the signal conductor layer 22. As a result, fluctuation of characteristic impedance generated in the signal conductor layer 22 is prevented or reduced. Further, since the area of the signal conductor layer 22 exposed to the first hollow portion H104 is reduced, deterioration such as oxidation of the signal conductor layer 22 is prevented or reduced.

Ninth Modification

Figure 15:
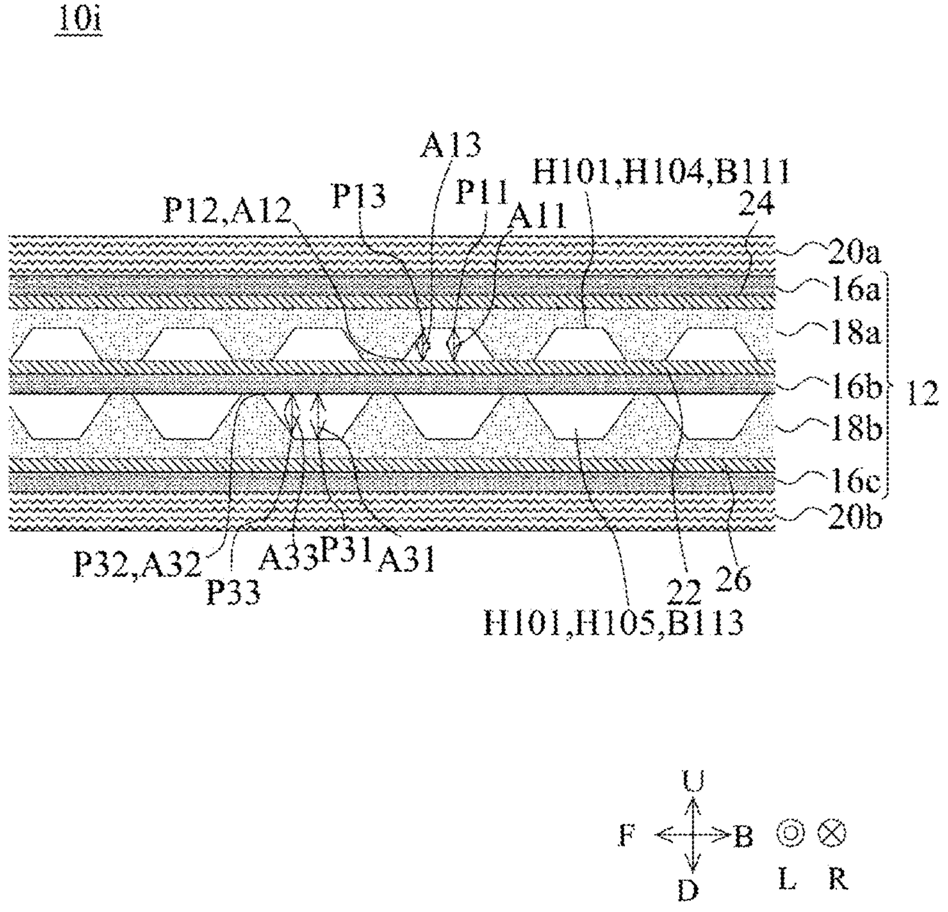
FIG. 15 is a sectional view of a transmission line perpendicular to the left-right direction.

Hereinafter, a transmission line 10*i* according to a ninth modification of a preferred embodiment of the present invention will be described with reference to the drawings. FIG. 15 is a sectional view of the transmission line 10*i* perpendicular to the left-right direction.

The transmission line 10*i* differs from the transmission line 10*f* in that each of a first hollow portion H104 and a second hollow portion H105 is a right half of a truncated quadrangular pyramid shape. With this configuration, the first hollow portion H104 is not in contact with the first ground conductor layer 24. The second hollow portion H105 is not in contact with the second ground conductor layer 26.

The transmission line 10*i* may achieve the same effect as the transmission line 10*f*. With the use of the transmission line 10*i*, loss of a radio frequency signal caused by reflection is reduced for the same reason as the transmission line 10*f*. Further, with the use of the transmission line 10*i*, deformation of each of the hollow portions H101 and H102 may be prevented or reduced for the same reason as the transmission line 10*f*.

Tenth Modification

Figure 16:
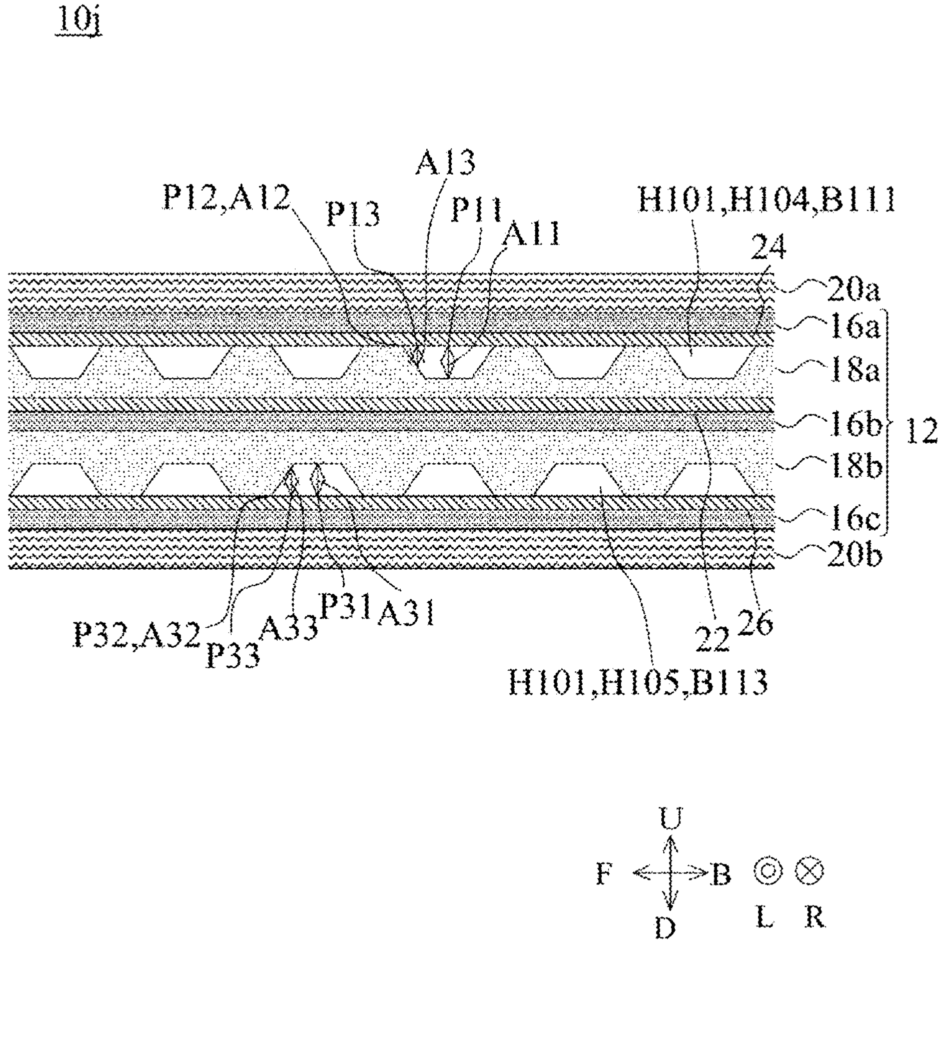
FIG. 16 is a sectional view of a transmission line perpendicular to the left-right direction.

Hereinafter, a transmission line 10*j* according to a tenth modification of a preferred embodiment of the present invention will be described with reference to the drawings. FIG. 16 is a sectional view of the transmission line 10*j* perpendicular to the left-right direction.

The transmission line 10*j* differs from the transmission line 10*i* in that the up-down direction of each of the first hollow portion H104 and the second hollow portion H105 is reversed. With this configuration, the first hollow portion H104 is not in contact with the signal conductor layer 22. The second hollow portion H105 is not in contact with the insulation layer 16*b*.

The transmission line 10*j* may achieve the same effect as the transmission line 10*i*. In the transmission line 10*j*, fluctuation of characteristic impedance generated in the signal conductor layer 22 is prevented or reduced for the same reason as in the transmission line 10*i*. Further, since the signal conductor layer 22 is not exposed to the first hollow portion H104, deterioration such as oxidation of the signal conductor layer 22 is prevented or reduced.

Eleventh Modification

Figure 17:
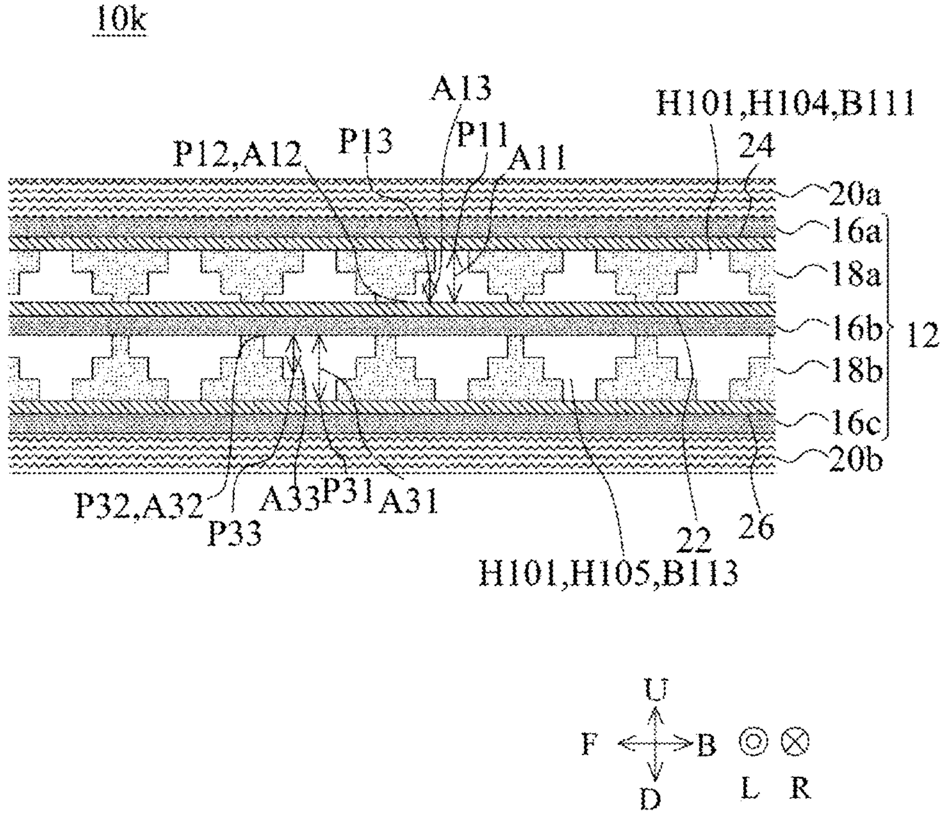
FIG. 17 is a sectional view of a transmission line perpendicular to the left-right direction.

Hereinafter, a transmission line 10*k* according to an eleventh modification of a preferred embodiment of the present invention will be described with reference to the drawings. FIG. 17 is a sectional view of the transmission line 10*k* perpendicular to the left-right direction.

The transmission line 10*i* differs from the transmission line 10*j* in a shape of each of a first hollow portion H104 and a second hollow portion H105. More specifically, in the transmission lines 10*f* and 10*k*, each of the first hollow portion H104 and the second hollow portion H105 is a right half of a truncated quadrangular pyramid shape. A side surface of each of the first hollow portion H104 and the second hollow portion H105 of the transmission line 10*f* has a flat surface. On the other hand, a side surface of each of the first hollow portion H104 and the second hollow portion H105 of the transmission line 10*k* has a stepped shape. Since the other structures of the transmission line 10*k* are the same as those of the transmission line 10*f*, a description thereof will be omitted. The transmission line 10*k* may achieve the same effect as the transmission line 10*f*.

The first hollow portion H104 and the second hollow portion H105 as described above are formed by making holes having different sizes in multiple insulation layers and laminating the multiple insulation layers.

Twelfth Modification

Figure 18:
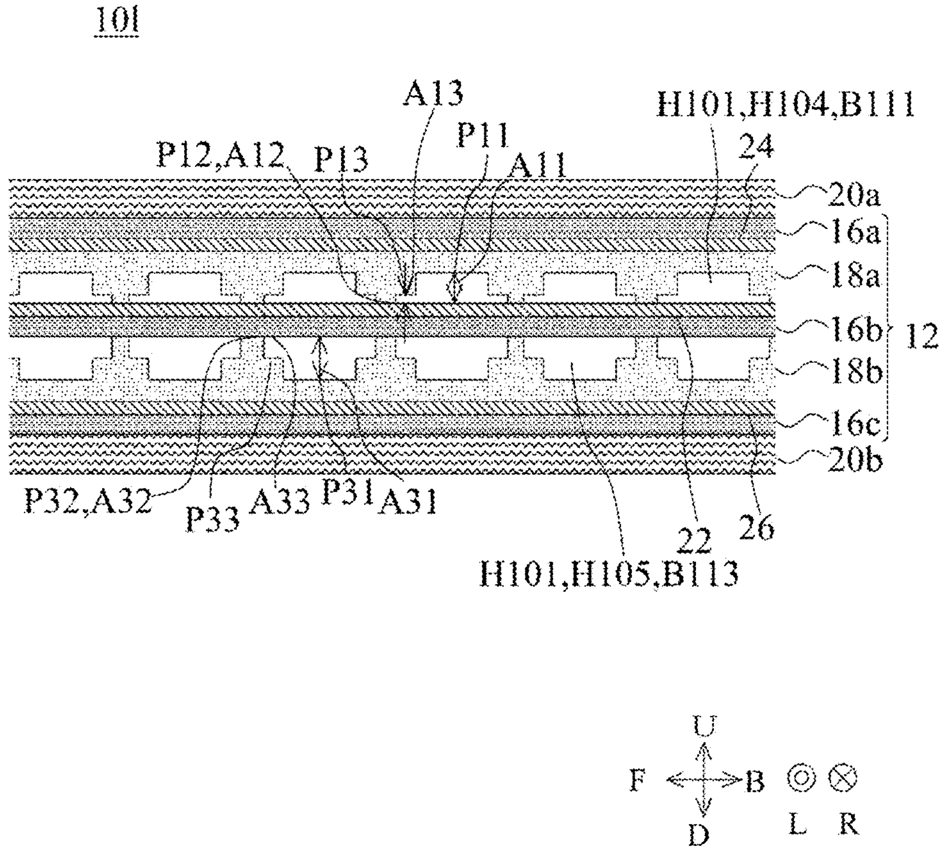
FIG. 18 is a sectional view of a transmission line perpendicular to the left-right direction.

Hereinafter, a transmission line 10*l* according to a twelfth modification of a preferred embodiment of the present invention will be described with reference to the drawings. FIG. 18 is a sectional view of the transmission line 10*l* perpendicular to the left-right direction.

The transmission line 10*l* differs from the transmission line 10*k* in that a first hollow portion H104 is not in contact with the first ground conductor layer 24 and a second hollow portion H105 is not in contact with the second ground conductor layer 26. Since the other structures of the transmission line 10*l* are the same as those of the transmission line 10*k*, a description thereof will be omitted. The transmission line 10*l* may achieve the same effect as the transmission line 10*k*.

Thirteenth Modification

Figure 19:
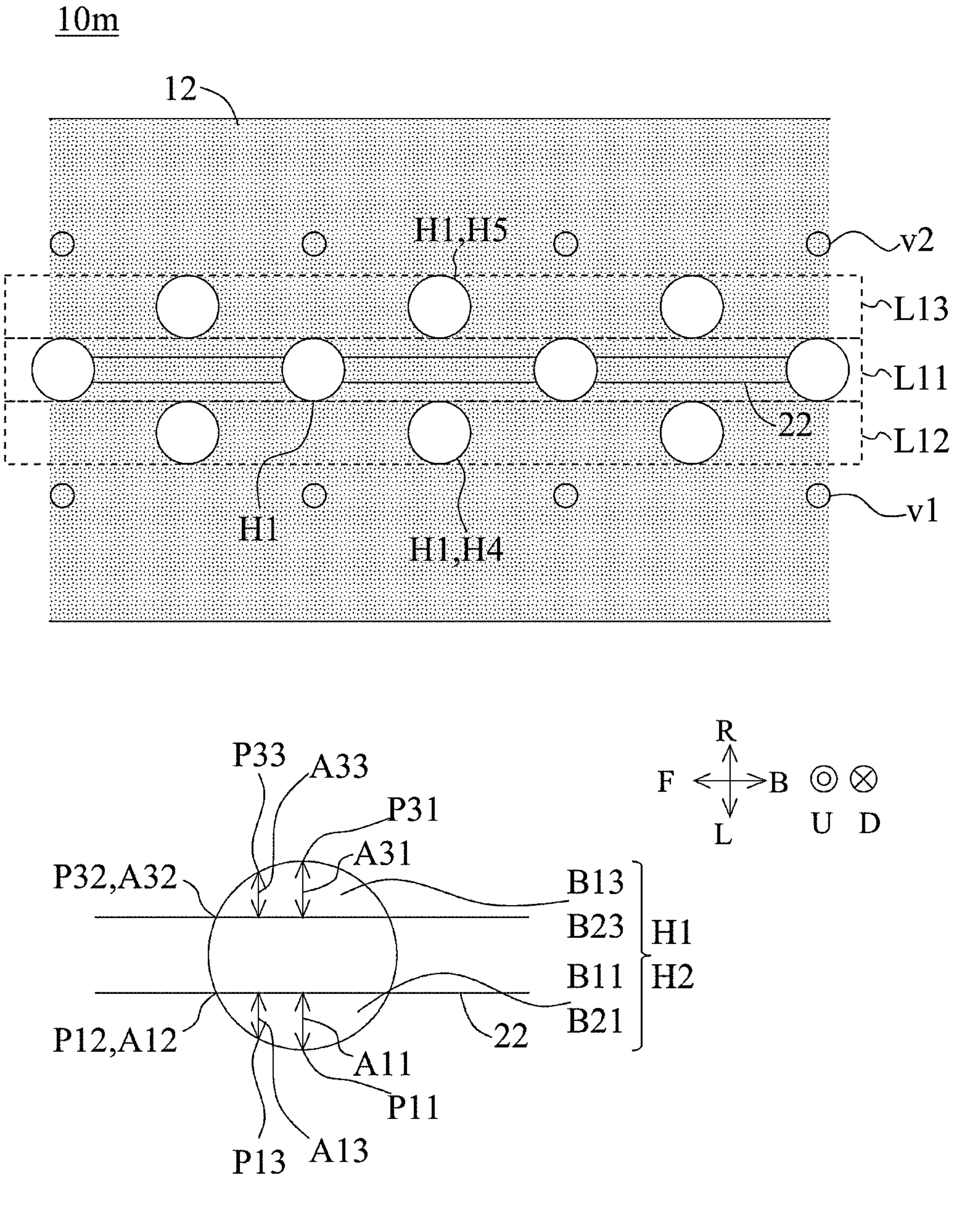
FIG. 19 is a perspective view of a transmission line in the up-down direction.
Figure 20:
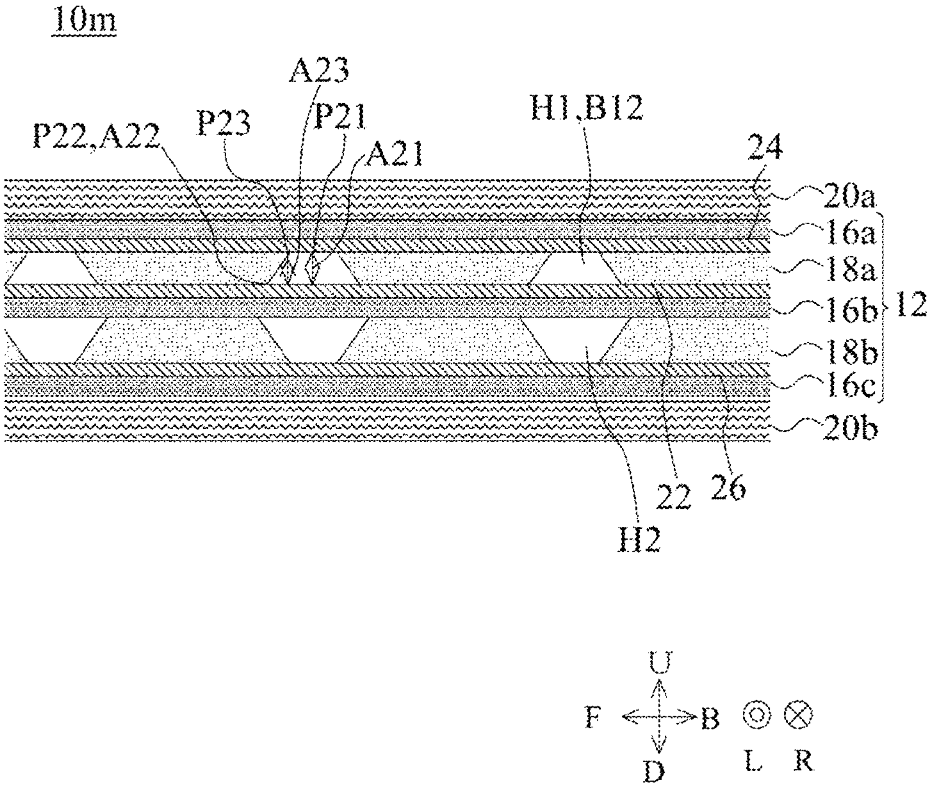
FIG. 20 is a sectional view of the transmission line perpendicular to the left-right direction.

Hereinafter, a transmission line 10*m* according to a thirteenth modification will be described with reference to the drawings. FIG. 19 is a perspective view of the transmission line 10*m* in the up-down direction. FIG. 20 is a sectional view of the transmission line 10*m* perpendicular to the left-right direction.

The transmission line 10*m* differs from the transmission line 10 in that a large number of hollow portions H1 and H2 are provided in each of the insulation layers 18*a* and 18*b* (as illustrated in FIG. 20). More specifically, the multiple insulation layers 18*a* are made of a porous material. Each of a large number of the hollow portions H1 has a truncated conical shape. A radius of each of a large number of the hollow portions H1 decreases from a lower side to an upper side. The multiple hollow portions H1 are arranged in the front-back direction. Note that the multiple hollow portions H1 are arranged in three rows. Hereinafter, as illustrated in FIG. 19, the middle row is referred to as a "first row" L11. A left side row is referred to as a "second row" L12. A right side row is referred to as a "third row" L13.

Each of the multiple hollow portions H1 of the first row L11 overlaps the signal conductor layer 22 when viewed in the up-down direction. Therefore, as illustrated in FIG. 19, the hollow portion H1 of the first row L11 includes a first portion B11 and a third portion B13. The first portion B11 is a portion of the hollow portion H1 positioned on the left (second orthogonal direction) of the signal conductor layer 22 when viewed in the up-down direction (first orthogonal direction). The third portion B13 is a portion of the hollow portion H1 positioned on the right (third orthogonal direction) of the signal conductor layer 22 when viewed in the up-down direction (first orthogonal direction).

Each of the multiple hollow portions H1 in the second row L12 is positioned to the left of the signal conductor layer 22 when viewed in the up-down direction. Therefore, as a result of each of the multiple hollow portions H1 in the second row L12 being positioned to the left of the signal conductor layer 22 when viewed in the up-down direction, each of the multiple hollow portions H1 of the second row L12 includes the first portion B11 and does not include the third portion B13. That is, the multiple hollow portions H1 of the second row L12 are multiple first hollow portions H4, as illustrated in FIG. 19.

Each of the multiple hollow portions H1 in the third row L13 is positioned to the right of the signal conductor layer 22 when viewed in the up-down direction. Therefore, as a result of each of the multiple hollow portions H1 in the third row L13 being positioned to the right of the signal conductor layer 22 when viewed in the up-down direction, each of the multiple hollow portions H1 of the third row L13 includes the third portion B13 and does not include the first portion B11. That is, the multiple hollow portions H1 in the third row L13 are multiple second hollow portions H5, as illustrated in FIG. 19.

Here, description will be made focusing on the hollow portion H1 of the first row L11. The hollow portion H1 of the first row L11 includes the first portion B11 and the third portion B13. The first portion B11 of the first row L11 is a portion of the hollow portion H1 positioned to the left (second orthogonal direction) of the signal conductor layer 22 when viewed in the up-down direction (first orthogonal direction). The first portion B11 has a semicircular shape when viewed in the up-down direction.

A width of the first portion B11 in the left-right direction (second orthogonal direction) has a first portion maximum width value A11, a first portion minimum width value A12, and a first portion intermediate width value A13 as illustrated in FIG. 19. The first portion intermediate width value A13 is smaller than the first portion maximum width value A11, and is larger than the first portion minimum width value A12. Here, as illustrated in FIG. 19 a first portion maximum width portion P11, a first portion minimum width portion P12, and a first portion intermediate width portion P13 are defined as follows.

First portion maximum width portion P11: a portion of the first portion B11 at which the width of the first portion B11 in the left-right direction (second orthogonal direction) has the first portion maximum width value A11

First portion minimum width portion P12: a portion of the first portion B11 at which the width of the first portion B11 in the left-right direction (second orthogonal direction) has the first portion minimum width value A12

First portion intermediate width portion P13: a portion of the first portion B11 at which the width of the first portion B11 in the left-right direction (second orthogonal direction) has the first portion intermediate width value A13

The first portion intermediate width portion P13 is positioned between the first portion maximum width portion P11 and the first portion minimum width portion P12 in the front-back direction. In the present preferred embodiment, therefore, the width of the first portion B11 in the left-right direction (second orthogonal direction) continuously increases between the first portion minimum width portion P12 and the first portion maximum width portion P11. Accordingly, the first portion intermediate width portion P13 is a section between the first portion minimum width portion P12 and the first portion maximum width portion P11. Note that, since the third portion B13 has a structure symmetrical to that of the first portion B11 in the left-right direction, a description thereof is omitted.

Further, the hollow portion H1 includes a second portion B12 positioned on the signal conductor layer 22 (first orthogonal direction) when viewed in the left-right direction (second orthogonal direction) as illustrated in FIG. 20. A width of the second portion B12 in the up-down direction (first orthogonal direction) has a second portion maximum width value A21, a second portion minimum width value A22, and a second portion intermediate width value A23 as illustrated in FIG. 20. The second portion intermediate width value A23 is smaller than the second portion maximum width value A21, and is larger than the second portion minimum width value A22. Here, as illustrated in FIG. 20 a second portion maximum width portion P21, a second portion minimum width portion P22, and a second portion intermediate width portion P23 are defined as follows.

Second portion maximum width portion P21: a portion of the second portion B12 at which the width of second portion B12 in the up-down direction (first orthogonal direction) has the second portion maximum width value A21.

Second portion minimum width portion P22: a portion of the second portion B12 at which the width of second portion B12 in the up-down direction (first orthogonal direction) has the second portion minimum width value A22.

Second portion intermediate width portion P23: a portion of the second portion B12 at which the width of the second portion B12 in the up-down direction (first orthogonal direction) has the second portion intermediate width value A23.

The second portion intermediate width portion P23 is positioned between the second portion maximum width portion P21 and the second portion minimum width portion P22 in the front-back direction. Note that, since a hollow portion H2 has a structure symmetrical to the hollow portion H1 in the up-down direction, a description thereof will be omitted. Further, since the other structures of the transmission line 10*m* are the same as those of the transmission line 10, a description thereof is omitted.

With the use of the transmission line 10*m*, the amount of resins to be removed from the insulation layers 18*a* and 18*b* is small in addition to the effect of the transmission line 10, since the multiple hollow portions H1 and H2 each are small. As a result, processing time of the insulation layers 18*a* and 18*b* is shortened.

Fourteenth Modification

Figure 21:
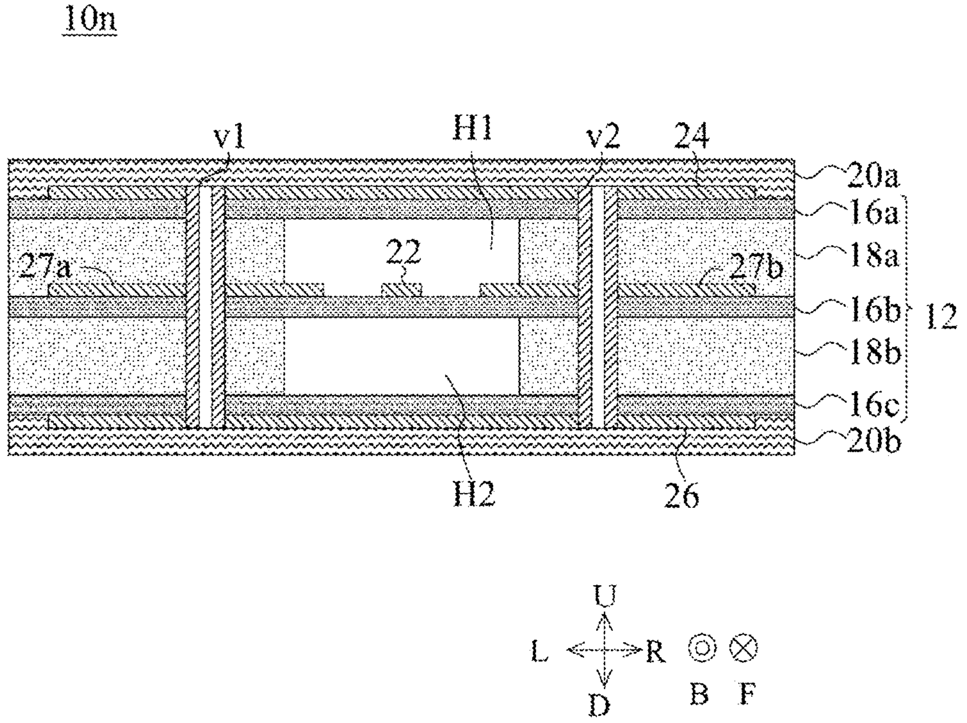
FIG. 21 is a sectional view of a transmission line perpendicular to the front-back direction.

Hereinafter, a transmission line 10*n* according to a fourteenth modification of a preferred embodiment of the present invention will be described with reference to the drawings. FIG. 21 is a sectional view of the transmission line 10*n* perpendicular to the front-back direction.

The transmission line 10*n* differs from the transmission line 10 in positions at which the first ground conductor layer 24 and the second ground conductor layer 26 are provided. The first ground conductor layer 24 is provided on the upper main surface of the insulation layer 16*a*. The second ground conductor layer 26 is provided on the lower main surface of the insulation layer 16*c*. Note that, in the transmission lines 10*a* to 10*m* as well, it is acceptable that the first ground conductor layer 24 is provided on the upper main surface of the insulation layer 16*a*, and the second ground conductor layer 26 is provided on the lower main surface of the insulation layer 16*c*. The transmission line 10*n* may achieve the same effect as the transmission line 10*b*.

Fifteenth Modification

Figure 22:
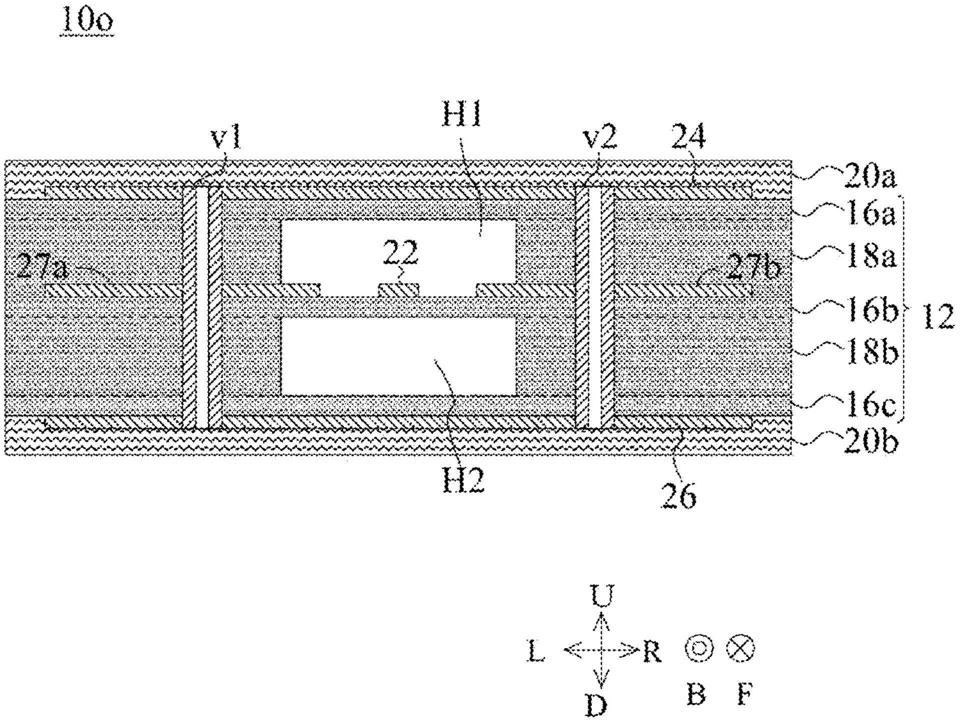
FIG. 22 is a sectional view of a transmission line perpendicular to the front-back direction.

Hereinafter, a transmission line 10*o* according to a fifteenth modification of a preferred embodiment of the present invention will be described with reference to the drawings. FIG. 22 is a sectional view of the transmission line 10*o* perpendicular to the front-back direction.

The transmission line 10*o* differs from the transmission line 10*n* in a material of each of the insulation layers 18*a* and 18*b*. More specifically, the material of each of the insulation layers 18*a* and 18*b* is the same as a material of each of the insulation layers 16*a* to 16*c*. With this, the insulation layers 16*a* to 16*c*, 18*a*, and 18*b* are welded by thermal pressure bonding. That is, the insulation layers 16*a* to 16*c*, 18*a*, and 18*b* include two insulation layers welded to each other. Note that, In the transmission lines 10, 10*a* to 10*m* as well, a material of each of the insulation layers 18*a* and 18*b* may be the same as a material of each of the insulation layers 16*a* to 16*c*. The transmission line 100 may achieve the same effect as the transmission line 10*n*.

Sixteenth Modification

Figure 23:
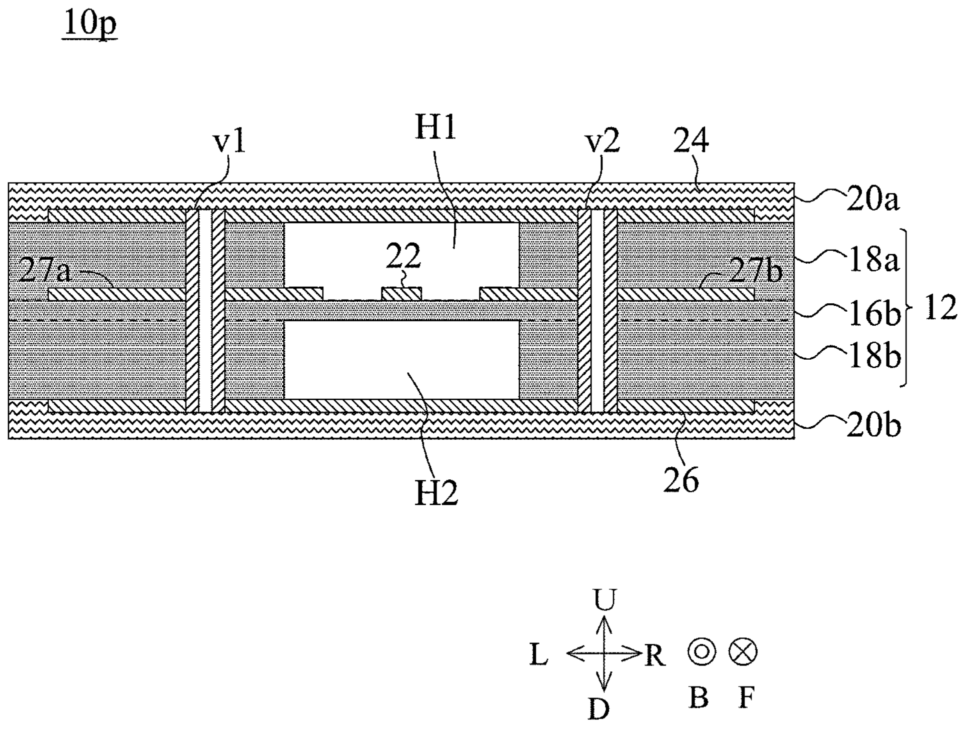
FIG. 23 is a sectional view of a transmission line perpendicular to the front-back direction.

Hereinafter, a transmission line 10*p* according to a sixteenth modification of a preferred embodiment of the present invention will be described with reference to the drawings. FIG. 23 is a sectional view of the transmission line 10*p* perpendicular to the front-back direction.

The transmission line 10*p* differs from the transmission line 10*o* in not including the insulation layers 16*a* and 16*c*. When the material of each of the insulation layers 18*a* and 18*b* is the same as the material of each of the insulation layers 16*a* to 16*c*, the insulation n layers 16*a* and 16*b* are not required. The transmission line 10*p* may achieve the same effect as the transmission line 10*o*.

Seventeenth Modification

Figure 24:
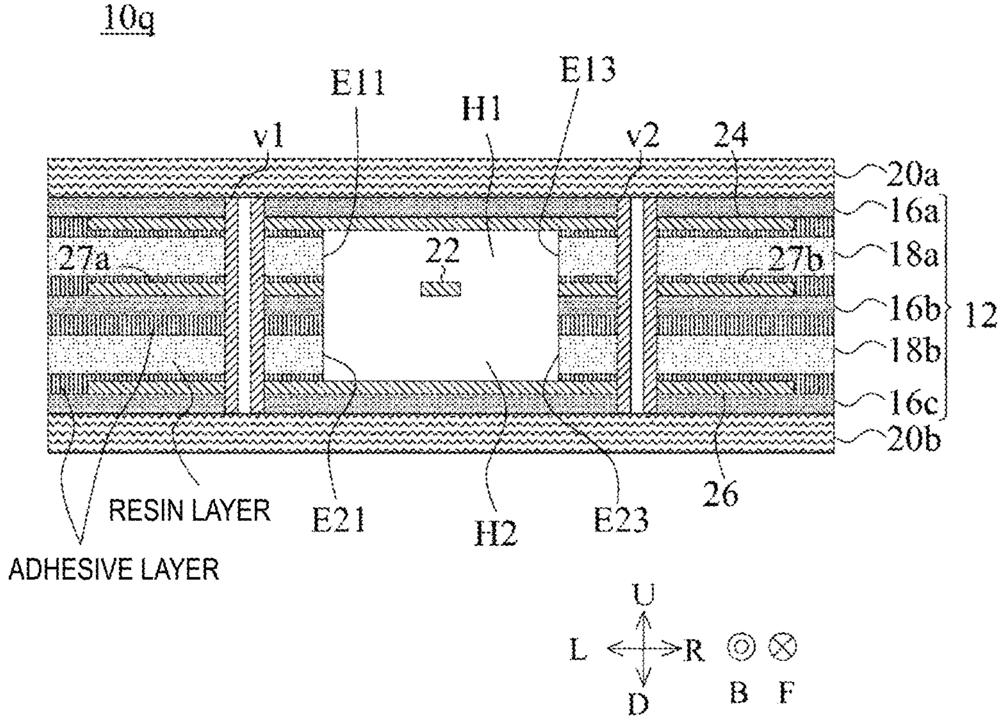
FIG. 24 is a sectional view of a transmission line perpendicular to the front-back direction.

Hereinafter, a transmission line 10*q* according to a seventeenth modification of a preferred embodiment of the present invention will be described with reference to the drawings. FIG. 24 is a sectional view of the transmission line 10*q* perpendicular to the front-back direction.

The transmission line 10*q* differs from the transmission line 10 in that the insulation layer 16*b* is not present in a region overlapping hollow portions H1 and H2 when viewed in the up-down direction. That is, the hollow portion H1 and the hollow portion H2 are connected to each other. Then, in a section orthogonal to the front-back direction, the entire outer edge of the signal conductor layer 22 faces the hollow portions H1 and H2. Since the other structures of the transmission line 10*q* are the same as those of the transmission line 10, a description thereof is omitted. The transmission line 10*q* may achieve the same effect as the transmission line 10.

Further, in the transmission line 10*q*, an area of the signal conductor layer 22 in contact with air increases. Dielectric loss being generated is reduced in the transmission line 10*q*.

Eighteenth Modification

Figure 25:
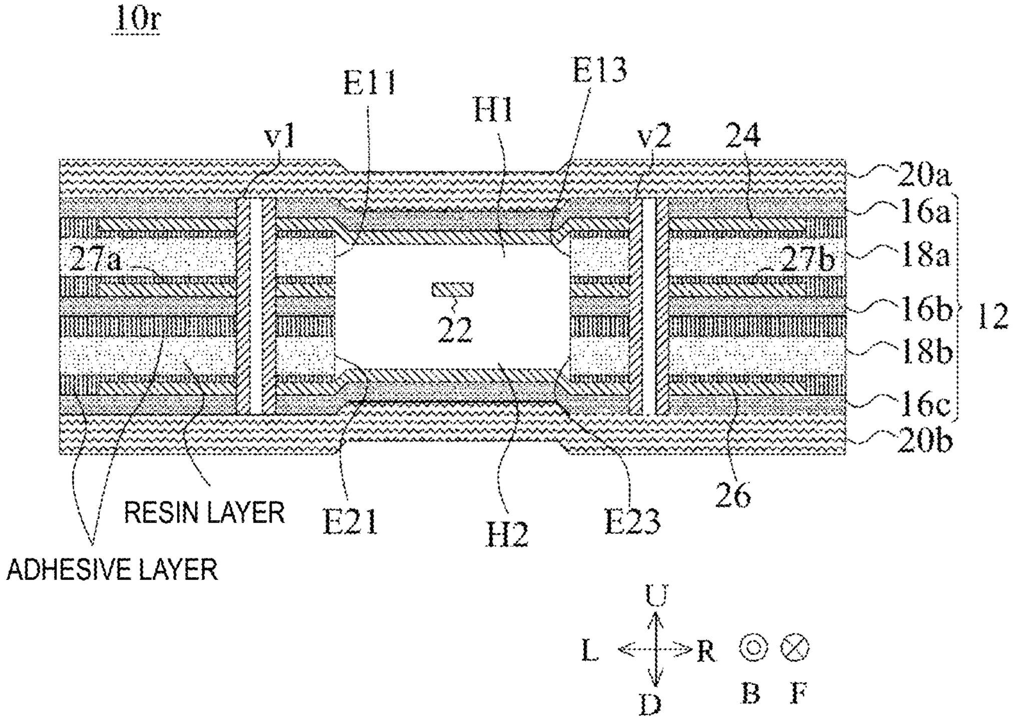
FIG. 25 is a sectional view of a transmission line perpendicular to the front-back direction.

Hereinafter, a transmission line 10*r* according to an eighteenth modification of a preferred embodiment of the present invention will be described with reference to the drawings. FIG. 25 is a sectional view of the transmission line 10*r* perpendicular to the front-back direction. FIG. 25 is a sectional view of a section at which hollow portions H1 and H2 are present.

The transmission line 10*r* differs from the transmission line 10*q* in the following points.

Portions of a protection layer 20*a*, an insulation layer 16*a*, and a first ground conductor layer 24 that overlap a hollow portion H1 in the up-down direction protrude downward.

Portions of a protection layer 20*b*, an insulation layer 16*c*, and a second ground conductor layer 26 that overlap a hollow portion H2 in the up-down direction protrude upward.

Since the transmission line 10*r* has the structure described above, a recess is formed in the first ground conductor layer 24 along the signal conductor layer 22. Similarly, a recess is formed in the second ground conductor layer 26 along the signal conductor layer 22. Since the other structures of the transmission line 10*r* are the same as those of the transmission line 10*q*, a description thereof will be omitted. The transmission line 10*r* may achieve the same effect as the transmission line 10*q*.

With the use of the transmission line 10*r*, since the portion of the transmission line 10*r* at which the signal conductor layer 22 is positioned is thin in the up-down direction, the insulation layers 16*a*, 16*b*, 16*c*, 18*a*, and 18*b* are in close contact with each other in a section in which the hollow portions H1 and H2 are not present. Further, since an adhesive layer is pushed out into the hollow portions H1 and H2 at the time of pressure bonding, an area of each of the insulation layers 16*a* to 16*c*, 18*a*, and 18*b* to which an adhesive adheres increases. With this configuration, the insulation layers 16*a* to 16*c*, 18*a*, and 18*b* are brought into close contact with each other. Furthermore, by being provided with the recess in each of the first ground conductor layer 24 and the second ground conductor layer 26, an area of the first ground conductor layer 24 and an area of the second ground conductor layer 26 increase. With this, the first ground conductor layer 24 and the second ground conductor layer 26 each are less likely to bend in the up-down direction. As a result, occurrence of unnecessary deformation in the non-bent sections A1 and A3 is prevented or reduced.

Other Preferred Embodiments

The transmission lines according to preferred embodiments of the present invention and modifications or combinations thereof are not limited to the transmission lines 10 and 10*a* to 10*r*, and may be changed within the scope of the gist thereof. The configurations of the transmission lines 10 and 10*a* to 10*r* may be arbitrarily combined.

The transmission lines 10 and 10*a* to 10*r* may include multiple signal conductor layers. In the case above, the multiple signal conductor layers may define a differential transmission line, for example. Further, the multiple signal conductor layers are not required to be provided on the same insulation layer.

In the transmission lines 10, 10*a* to 10*r*, the signal terminals 28*a* and 28*b*, and the ground terminal 29*a*, 29*b*, 30*a*, and 30*b* may be provided on the lower main surface of the multilayer body 12.

The transmission lines 10 and 10*a* to 10*r* may further include other circuits in addition to the strip line.

Electronic components other than the connectors 32*a* to 32*b* may be mounted on the transmission lines 10 and 10*a* to 10*r*.

The transmission lines 10 and 10*a* to 10*r* each have a linear shape when viewed in the up-down direction. However, the transmission lines 10 and 10*a* to 10*r* may be bent. Here, "the transmission lines 10 and 10*a* to 10*r* are bent" means that the transmission lines 10 and 10*a* to 10*r* each have a bent shape without external force being applied to the transmission lines 10 and 10*a* to 10*r*. In the case above, the front-back direction differs depending on a position of the signal conductor layer 22.

In the transmission lines 10 and 10*a* to 10*r*, the hollow portions H1 and H101, and the hollow portions H2 and H102 are provided in the non-bent sections A1 and A3, and are not required to be provided in the bent section A2.

Note that the second ground conductor layer 26 is not an essential element. In the case above, the signal conductor layer 22 and the first ground conductor layer 24 define a microstrip line structure.

Note that an insulation layer may further be laminated on the upper main surface of the insulation layer 16*b*. In the case above, the signal conductor layer 22 is sandwiched between the insulation layer 16*a* and the insulation layer 16*b*, and thus is not exposed to the hollow portion H1.

In the transmission lines 10, 10*a* to 10*e*, and 10*n* to 10*q*, a portion of the first ground conductor layer 24 may protrude downward and a portion of the second ground conductor layer 26 may protrude upward as in the transmission line 10*r*.

In the transmission lines 10 and 10*a* to 10*p*, the entire outer edge of the signal conductor layer 22 may face the hollow portions H1 and H2 in a section orthogonal to the front-back direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transmission line, comprising:
- a multilayer body including insulation layers laminated in an up-down direction;
- a signal conductor layer provided in the multilayer body and extending in a front-back direction orthogonal to the up-down direction; and
- a first ground conductor layer provided in the multilayer body and provided above the signal conductor layer to overlap the signal conductor layer when viewed in the up-down direction; wherein
- a hollow portion is provided in the multilayer body;
- the hollow portion overlaps the first ground conductor layer when viewed in the up-down direction;
- a first orthogonal direction orthogonal to the front-back direction, and a direction orthogonal to the front-back direction and the first orthogonal direction, are defined as a second orthogonal direction;
- when viewed in the first orthogonal direction, the hollow portion includes a first portion positioned in the second orthogonal direction of the signal conductor layer;
- a width of the first portion in the second orthogonal direction has a first portion maximum width value, a first portion minimum width value, and a first portion intermediate width value less than the first portion maximum width value and greater than the first portion minimum width value;
- in the first portion, a portion at which the width of the first portion in the second orthogonal direction has the first portion maximum width value is a first portion maximum width portion;
- in the first portion, a portion at which the width of the first portion in the second orthogonal direction has the first portion minimum width value is a first portion minimum width portion;
- in the first portion, a portion at which the width of the first portion in the second orthogonal direction has the first portion intermediate width value is a first portion intermediate width portion;
- the first portion intermediate width portion is positioned between the first portion maximum width portion and the first portion minimum width portion in the front-back direction; and
- at least one of the multiple insulation layers defines and functions as an adhesive layer to bond two of the multiple insulation layers that are located above and below the adhesive layer.

2. The transmission line according to claim 1, wherein the first orthogonal direction is the up-down direction.

3. The transmission line according to claim 1, wherein the first orthogonal direction is a left-right direction.

4. The transmission line according to claim 1, wherein
- when viewed in the second orthogonal direction, the hollow portion includes a second portion positioned in the first orthogonal direction of the signal conductor layer;
- a width of the second portion in the first orthogonal direction has a second portion maximum width value, a second portion minimum width value, and a second portion intermediate width value less than the second portion maximum width value and greater than the second portion minimum width value;

in the second portion, a portion at which the width of the second portion in the first orthogonal direction has the second portion maximum width value is a second portion maximum width portion, in the second portion, a portion at which the width of the second portion in the first orthogonal direction has the second portion minimum width value is a second portion minimum width portion;

in the second portion, a portion at which the width of the second portion in the first orthogonal direction has the second portion intermediate width value is a second portion intermediate width portion; and the second portion intermediate width portion is positioned between the second portion maximum width portion and the second portion minimum width portion in the front-back direction.

5. The transmission line according to claim 1, wherein a direction opposite to the second orthogonal direction is a third orthogonal direction;

when viewed in the first orthogonal direction, the hollow portion includes a third portion positioned in the third orthogonal direction of the signal conductor layer;

a width of the third portion in the third orthogonal direction has a third portion maximum width value, a third portion minimum width value, and a third portion intermediate width value less than the third portion maximum width value and greater than the third portion minimum width value;

in the third portion, a portion at which the width of the third portion in the third orthogonal direction has the third portion maximum width value is a third portion maximum width portion;

in the third portion, a portion at which the width of the third portion in the third orthogonal direction has the third portion minimum width value is a third portion minimum width portion;

in the third portion, a portion at which the width of the third portion in the third orthogonal direction has the third portion intermediate width value is a third portion intermediate width portion; and the third portion intermediate width portion is positioned between the third portion maximum width portion and the third portion minimum width portion in the front-back direction.

6. The transmission line according to claim 5, wherein the first portion has a first periodic structure in which the width of the first portion in the second orthogonal direction periodically changes with a predetermined distance in the front-back direction;

the third portion has a third periodic structure in which the width of the third portion in the third orthogonal direction periodically changes with the predetermined distance in the front-back direction; and a phase of the first periodic structure and a phase of the third periodic structure coincide with each other.

7. The transmission line according to claim 5, wherein the first portion has a first periodic structure in which the width of the first portion in the second orthogonal direction periodically changes with a predetermined distance in the front-back direction;

the third portion has a third periodic structure in which the width of the third portion in the third orthogonal direction periodically changes with the predetermined distance in the front-back direction; and a phase of the first periodic structure and a phase of the third periodic structure are shifted from each other by a half period.

8. The transmission line according to claim 5, wherein multiple hollow portions each of which is the hollow portion are provided in the multilayer body.

9. The transmission line according to claim 8, wherein the multiple hollow portions include multiple first hollow portions each of which includes the first portion and does not include the third portion, and multiple second hollow portions each of which does not include the first portion and includes the third portion; and the multiple first hollow portions and the multiple second hollow portions are alternately arranged in the front-back direction.

10. The transmission line according to claim 1, wherein the signal conductor layer includes a first portion in contact with the hollow portion and a second portion not in contact with the hollow portion in the up-down direction and a width direction in an extending direction of the signal conductor layer, and includes a third portion in a middle of at least one of the up-down direction and the width direction.

11. An electronic device, comprising:

the transmission line according to claim 1.

12. The transmission line according to claim 1, wherein at least one of the multiple insulation layers is made of a porous material.

13. The transmission line according to claim 1, further comprising:

an interlayer connection conductor connected to the first ground conductor layer; wherein a position of the interlayer connection conductor in the front-back direction coincides with a position of the first portion minimum width portion in the front-back direction.

14. The transmission line according to claim 1, wherein the hollow portion is not in contact with the signal conductor layer.

15. The transmission line according to claim 1, wherein an entire outer edge of the signal conductor layer faces the hollow portion in a section orthogonal to the front-back direction.

16. The transmission line according to claim 1, wherein, in the hollow portion, the first portion minimum width portion is sandwiched between the first portion intermediate width portion and another intermediate width portion.

17. A transmission line, comprising:

a multilayer body including insulation layers laminated in an up-down direction;

a signal conductor layer provided in the multilayer body and extending in a front-back direction orthogonal to the up-down direction; and a first ground conductor layer provided in the multilayer body and provided above the signal conductor layer to overlap the signal conductor layer when viewed in the up-down direction; wherein a hollow portion is provided in the multilayer body;

the hollow portion overlaps the first ground conductor layer when viewed in the up-down direction;

a first orthogonal direction orthogonal to the front-back direction, and a direction orthogonal to the front-back direction and the first orthogonal direction, are defined as a second orthogonal direction;

when viewed in the first orthogonal direction, the hollow portion includes a first portion positioned in the second orthogonal direction of the signal conductor layer;

a width of the first portion in the second orthogonal direction has a first portion maximum width value, a first portion minimum width value, and a first portion intermediate width value less than the first portion maximum width value and greater than the first portion minimum width value;

in the first portion, a portion at which the width of the first portion in the second orthogonal direction has the first portion maximum width value is a first portion maximum width portion;

in the first portion, a portion at which the width of the first portion in the second orthogonal direction has the first portion minimum width value is a first portion minimum width portion;

in the first portion, a portion at which the width of the first portion in the second orthogonal direction has the first portion intermediate width value is a first portion intermediate width portion;

the first portion intermediate width portion is positioned between the first portion maximum width portion and the first portion minimum width portion in the front-back direction;

the first orthogonal direction is the up-down direction; and a portion of the first ground conductor layer overlapping the hollow portion in the up-down direction protrudes downward.

18. A transmission line, comprising:

a multilayer body including insulation layers laminated in an up-down direction;

a signal conductor layer provided in the multilayer body and extending in a front-back direction orthogonal to the up-down direction; and a first ground conductor layer provided in the multilayer body and provided above the signal conductor layer to overlap the signal conductor layer when viewed in the up-down direction; wherein a hollow portion is provided in the multilayer body;

the hollow portion overlaps the first ground conductor layer when viewed in the up-down direction;

a first orthogonal direction orthogonal to the front-back direction, and a direction orthogonal to the front-back direction and the first orthogonal direction, are defined as a second orthogonal direction;

when viewed in the first orthogonal direction, the hollow portion includes a first portion positioned in the second orthogonal direction of the signal conductor layer;

a width of the first portion in the second orthogonal direction has a first portion maximum width value, a first portion minimum width value, and a first portion intermediate width value less than the first portion maximum width value and greater than the first portion minimum width value;

in the first portion, a portion at which the width of the first portion in the second orthogonal direction has the first portion maximum width value is a first portion maximum width portion;

in the first portion, a portion at which the width of the first portion in the second orthogonal direction has the first portion minimum width value is a first portion minimum width portion;

in the first portion, a portion at which the width of the first portion in the second orthogonal direction has the first portion intermediate width value is a first portion intermediate width portion;

the first portion intermediate width portion is positioned between the first portion maximum width portion and the first portion minimum width portion in the front-back direction; and an entirety of all of the outer edges of the signal conductor layer face the hollow portion in a section orthogonal to the front-back direction.

* * * * *